US007760071B2

(12) United States Patent
McConnell et al.

(10) Patent No.: US 7,760,071 B2
(45) Date of Patent: Jul. 20, 2010

(54) APPLIANCE REMOTE CONTROL HAVING SEPARATED USER CONTROL AND TRANSMITTER MODULES REMOTELY LOCATED FROM AND DIRECTLY CONNECTED TO ONE ANOTHER

(75) Inventors: John E. McConnell, Ann Arbor, MI (US); John Nantz, Brighton, MI (US); Jason Summerford, Novi, MI (US); Frank Buccinna, Livonia, MI (US); Mark D. Chuey, Northville, MI (US)

(73) Assignee: Lear Corporation, Southfield, MI (US)

( * ) Notice: Subject to any disclaimer, the term of this patent is extended or adjusted under 35 U.S.C. 154(b) by 735 days.

(21) Appl. No.: 11/522,631

(22) Filed: Sep. 18, 2006

(65) Prior Publication Data

US 2007/0013546 A1 Jan. 18, 2007

Related U.S. Application Data

(63) Continuation-in-part of application No. 10/630,173, filed on Jul. 30, 2003, now Pat. No. 7,183,941.

(51) Int. Cl.
*G05B 19/00* (2006.01)
*G06F 7/00* (2006.01)
*G06F 7/04* (2006.01)
*G08C 19/00* (2006.01)

(52) U.S. Cl. ...................... 340/5.71; 340/5.2; 340/5.21; 340/5.22; 340/5.51

(58) Field of Classification Search ................ 340/5.71, 340/5.2, 5.21, 5.22, 5.51
See application file for complete search history.

(56) References Cited

U.S. PATENT DOCUMENTS 1,522,241 A 1/1925 Hennessey
3,098,212 A 7/1963 Creamer, Jr.
3,300,867 A 1/1967 Sampson
3,337,992 A 8/1967 Tolson
3,456,387 A 7/1969 Tolson (Continued)

FOREIGN PATENT DOCUMENTS

DE 42 04 463 A1 8/1992

(Continued)

OTHER PUBLICATIONS

Marantec America Accessories Listing, Sep. 30, 2002, 3 pages.
Marantec America Products Listing, Sep. 30, 2002, 3 pages.
Marantec America Openers With a Difference Listing, Sep. 30, 2002, 2 pages.

(Continued)

*Primary Examiner*—Benjamin C Lee
*Assistant Examiner*—Andrew Bee
(74) *Attorney, Agent, or Firm*—Brooks Kushman P.C.

(57) ABSTRACT

Vehicle-based programmable appliance control systems and methods include a user control module and a transmitter module which are remotely located from one another. A wired connection, such as a vehicle wiring harness, directly interconnects the modules. The wired connection has two ends and is assigned solely to the modules as the user control module is connected to one end of the wired connection and the transmitter module is connected to the other end of the wired connection. The user control module includes a user control and the transmitter module includes a radio frequency transmitter. The user control module transmits a user activation signal based on assertion of the user control to the transmitter module for receipt by the transmitter via the wired connection. The transmitter transmits a radio frequency appliance activation signal based on the received user activation signal in order to activate an appliance.

9 Claims, 14 Drawing Sheets

U.S. PATENT DOCUMENTS

| | | | |
|---|---|---|---|
| 3,680,951 A | | 8/1972 | Jordan et al. |
| 4,074,200 A | | 2/1978 | Buchta |
| 4,167,833 A | | 9/1979 | Farina |
| 4,178,549 A | | 12/1979 | Ledenbach et al. |
| 4,219,812 A | | 8/1980 | Rittenbach |
| 4,241,870 A | | 12/1980 | Marcus |
| 4,247,850 A | | 1/1981 | Marcus |
| 4,425,647 A | * | 1/1984 | Collins et al. ............... 714/823 |
| 4,425,717 A | | 1/1984 | Marcus |
| 4,447,808 A | | 5/1984 | Marcus |
| 4,453,161 A | | 6/1984 | Lemelson |
| 4,482,947 A | | 11/1984 | Zato et al. |
| 4,529,980 A | | 7/1985 | Liotine et al. |
| 4,535,333 A | | 8/1985 | Twardowski |
| 4,581,827 A | | 4/1986 | Higashi |
| 4,595,228 A | | 6/1986 | Chu |
| 4,598,287 A | | 7/1986 | Osakabe et al. |
| 4,623,887 A | | 11/1986 | Welles, II |
| 4,631,708 A | | 12/1986 | Wood et al. |
| 4,635,033 A | | 1/1987 | Inukai et al. |
| 4,638,433 A | | 1/1987 | Schindler |
| 4,665,397 A | | 5/1987 | Pinnow |
| 4,676,601 A | | 6/1987 | Itoh |
| 4,700,327 A | | 10/1987 | Hilton |
| 4,703,359 A | | 10/1987 | Rumbolt et al. |
| 4,706,299 A | | 11/1987 | Jorgensen |
| 4,707,788 A | | 11/1987 | Tashiro et al. |
| RE32,576 E | | 1/1988 | Pastore |
| 4,727,302 A | | 2/1988 | Mizuta |
| 4,743,905 A | | 5/1988 | Wiegand |
| 4,747,159 A | | 5/1988 | Kato |
| 4,750,118 A | | 6/1988 | Heitschel |
| 4,754,255 A | | 6/1988 | Sanders |
| 4,771,283 A | | 9/1988 | Imoto |
| 4,793,690 A | | 12/1988 | Gahan |
| 4,799,189 A | | 1/1989 | Grover |
| 4,806,930 A | | 2/1989 | Wojciak, Jr. |
| 4,825,200 A | | 4/1989 | Evans et al. |
| 4,866,434 A | | 9/1989 | Keenan |
| 4,881,148 A | | 11/1989 | Lambropoulos |
| 4,882,565 A | | 11/1989 | Gallmeyer |
| 4,886,960 A | | 12/1989 | Molyneux et al. |
| 4,890,108 A | | 12/1989 | Drori et al. |
| 4,896,030 A | | 1/1990 | Miyaji |
| 4,905,279 A | | 2/1990 | Mishio |
| 4,912,463 A | | 3/1990 | Li |
| 4,917,477 A | | 4/1990 | Bechtel et al. |
| 4,953,305 A | | 9/1990 | Van Lente et al. |
| 4,959,810 A | | 9/1990 | Darbee et al. |
| 4,978,944 A | | 12/1990 | Andros |
| 4,988,992 A | | 1/1991 | Heitschel |
| 5,016,996 A | | 5/1991 | Ueno |
| 5,064,274 A | | 11/1991 | Alten |
| 5,085,062 A | | 2/1992 | Capdevila |
| 5,103,221 A | | 4/1992 | Memmola |
| 5,109,222 A | | 4/1992 | Welty |
| 5,113,821 A | | 5/1992 | Fukui et al. |
| 5,122,647 A | | 6/1992 | Lynam |
| 5,123,008 A | | 6/1992 | Beesley |
| 5,126,686 A | | 6/1992 | Tam |
| 5,146,215 A | | 9/1992 | Drori |
| 5,154,617 A | | 10/1992 | Suman et al. |
| 5,181,423 A | | 1/1993 | Phillips |
| 5,191,610 A | | 3/1993 | Hill et al. |
| 5,193,210 A | | 3/1993 | Nicholas et al. |
| 5,201,067 A | | 4/1993 | Grube et al. |
| 5,225,847 A | | 7/1993 | Roberts et al. |
| 5,243,322 A | | 9/1993 | Thompson |
| 5,252,960 A | | 10/1993 | Duhame |
| 5,252,977 A | | 10/1993 | Lueker |
| 5,266,945 A | | 11/1993 | Peek et al. |
| 5,278,547 A | | 1/1994 | Suman et al. |
| 5,369,706 A | | 11/1994 | Latka |
| 5,379,453 A | | 1/1995 | Tigwell |
| 5,398,284 A | | 3/1995 | Koopman, Jr. et al. |
| 5,402,105 A | | 3/1995 | Doyle |
| 5,408,698 A | | 4/1995 | Serizawa |
| 5,412,379 A | | 5/1995 | Waraksa et al. |
| 5,420,925 A | | 5/1995 | Michaels |
| 5,442,340 A | | 8/1995 | Dykema |
| 5,455,716 A | | 10/1995 | Suman et al. |
| 5,463,374 A | | 10/1995 | Mendez |
| 5,471,668 A | | 11/1995 | Soenen et al. |
| 5,473,317 A | | 12/1995 | Inomata et al. |
| 5,475,366 A | | 12/1995 | Van Lente et al. |
| 5,479,155 A | | 12/1995 | Zeinstra et al. |
| 5,481,256 A | | 1/1996 | Darbee et al. |
| 5,510,791 A | | 4/1996 | Viertel et al. |
| 5,517,187 A | | 5/1996 | Bruwer |
| 5,528,230 A | | 6/1996 | Kim |
| 5,554,977 A | | 9/1996 | Jablonski et al. |
| RE35,364 E | | 10/1996 | Heitschel et al. |
| 5,564,101 A | | 10/1996 | Eisfeld et al. |
| 5,583,485 A | | 12/1996 | Van Lente et al. |
| 5,594,429 A | | 1/1997 | Nakahara |
| 5,596,316 A | | 1/1997 | Honeck |
| 5,598,475 A | | 1/1997 | Soenen |
| 5,613,732 A | | 3/1997 | Demick |
| 5,614,885 A | | 3/1997 | Van Lente |
| 5,614,891 A | | 3/1997 | Zeinstra |
| 5,614,906 A | | 3/1997 | Hayes et al. |
| 5,619,190 A | | 4/1997 | Duckworth |
| 5,627,529 A | | 5/1997 | Duckworth |
| 5,645,308 A | | 7/1997 | Fink |
| 5,646,701 A | | 7/1997 | Duckworth |
| 5,661,455 A | | 8/1997 | Van Lente |
| 5,661,651 A | | 8/1997 | Geschke et al. |
| 5,661,804 A | | 8/1997 | Dykema |
| 5,680,131 A | | 10/1997 | Utz |
| 5,680,134 A | | 10/1997 | Tsui |
| 5,686,903 A | | 11/1997 | Duckworth |
| 5,686,904 A | | 11/1997 | Bruwer |
| 5,691,848 A | | 11/1997 | Van Lente |
| 5,699,044 A | | 12/1997 | Van Lente |
| 5,699,054 A | | 12/1997 | Duckworth |
| 5,699,055 A | | 12/1997 | Dykema |
| 5,708,415 A | | 1/1998 | Van Lente |
| 5,715,020 A | | 2/1998 | Kuroiwa et al. |
| 5,726,645 A | | 3/1998 | Kamon et al. |
| 5,731,756 A | | 3/1998 | Roddy |
| 5,751,224 A | | 5/1998 | Fitzgibbon |
| 5,758,300 A | | 5/1998 | Abe |
| 5,764,099 A | * | 6/1998 | Hewitt ......................... 327/545 |
| 5,774,064 A | | 6/1998 | Lambropoulos |
| 5,790,948 A | | 8/1998 | Eisfeld et al. |
| 5,793,300 A | | 8/1998 | Suman et al. |
| 5,810,420 A | | 9/1998 | Welling |
| 5,812,097 A | | 9/1998 | Maldonado |
| 5,831,548 A | | 11/1998 | Fitzgibbon |
| 5,838,255 A | | 11/1998 | Di Croce |
| 5,841,253 A | | 11/1998 | Fitzgibbon |
| 5,841,390 A | | 11/1998 | Tsui |
| 5,841,813 A | | 11/1998 | Van Nee |
| 5,844,473 A | | 12/1998 | Kaman |
| 5,845,593 A | | 12/1998 | Birkestrand |
| 5,854,593 A | * | 12/1998 | Dykema et al. ........ 340/825.22 |
| 5,872,513 A | | 2/1999 | Fitzgibbon |
| 5,903,226 A | | 5/1999 | Suman et al. |
| 5,910,784 A | * | 6/1999 | Lai ............................ 341/176 |
| 5,926,087 A | | 7/1999 | Busch et al. |
| 5,926,106 A | | 7/1999 | Beran et al. |
| 5,940,000 A | | 8/1999 | Dykema |
| 5,940,007 A | | 8/1999 | Brinkmeyer |
| 5,940,120 A | | 8/1999 | Frankhouse et al. |

| | | | |
|---|---|---|---|
| 5,949,349 | A | 9/1999 | Farris et al. |
| 5,990,828 | A | 11/1999 | King |
| 5,995,898 | A | 11/1999 | Tuttle |
| 6,002,332 | A | 12/1999 | King |
| 6,005,508 | A | 12/1999 | Tsui |
| 6,008,735 | A | 12/1999 | Chiloyan et al. |
| 6,009,355 | A | 12/1999 | Obradovich et al. |
| 6,020,829 | A | 2/2000 | Hormann |
| 6,021,319 | A | 2/2000 | Tigwell |
| 6,023,241 | A | 2/2000 | Clapper |
| 6,025,785 | A | 2/2000 | Farris et al. |
| 6,031,465 | A | 2/2000 | Burgess |
| 6,043,753 | A | 3/2000 | Okayasu et al. |
| 6,049,289 | A | 4/2000 | Waggamon |
| 6,055,468 | A | 4/2000 | Kaman et al. |
| 6,055,508 | A | 4/2000 | Naor et al. |
| RE36,703 | E | 5/2000 | Heitschel et al. |
| 6,072,404 | A | 6/2000 | Nolan et al. |
| 6,072,436 | A | 6/2000 | Marougi |
| 6,078,271 | A | 6/2000 | Roddy |
| 6,081,203 | A | 6/2000 | Fitzgibbon |
| 6,091,330 | A | 7/2000 | Swan et al. |
| 6,091,343 | A | 7/2000 | Dykema et al. |
| 6,097,309 | A | 8/2000 | Hayes et al. |
| 6,104,101 | A | 8/2000 | Miller et al. |
| 6,127,740 | A | 10/2000 | Roddy |
| 6,127,922 | A | 10/2000 | Roddy et al. |
| 6,127,961 | A | 10/2000 | Stacy et al. |
| 6,130,625 | A | 10/2000 | Harvey |
| 6,131,019 | A | 10/2000 | King |
| 6,137,421 | A | 10/2000 | Dykema |
| 6,144,114 | A | 11/2000 | Chutorash |
| 6,154,148 | A | 11/2000 | Fluharty et al. |
| 6,154,544 | A | 11/2000 | Farris et al. |
| 6,157,319 | A | 12/2000 | Johns et al. |
| 6,160,319 | A | 12/2000 | Marougi et al. |
| 6,166,650 | A | 12/2000 | Bruwer |
| 6,175,312 | B1 | 1/2001 | Bruwer et al. |
| 6,181,255 | B1 | 1/2001 | Crimmins |
| 6,188,889 | B1 | 2/2001 | Tsai |
| 6,191,701 | B1 | 2/2001 | Bruwer |
| 6,236,350 | B1 | 5/2001 | Andrews |
| 6,243,000 | B1 | 6/2001 | Tsui |
| 6,249,673 | B1 | 6/2001 | Tsui |
| 6,265,987 | B1 | 7/2001 | Wang et al. |
| 6,271,765 | B1 | 8/2001 | King |
| 6,275,379 | B1 | 8/2001 | Quinno et al. |
| 6,282,152 | B1 | 8/2001 | Kurple |
| 6,303,083 | B1 | 10/2001 | King |
| 6,320,514 | B1 | 11/2001 | Flick |
| 6,333,698 | B1 | 12/2001 | Roddy |
| 6,344,817 | B1 | 2/2002 | Verzulli |
| 6,359,558 | B1 | 3/2002 | Tsui |
| 6,362,771 | B1 | 3/2002 | Schofield et al. |
| 6,377,173 | B1 | 4/2002 | Desai |
| 6,396,408 | B2 | 5/2002 | Drummond |
| 6,397,058 | B1 | 5/2002 | Thibert et al. |
| 6,414,587 | B1 | 7/2002 | Fitzgibbon |
| 6,426,706 | B1 | 7/2002 | King |
| 6,441,719 | B1 | 8/2002 | Tsui |
| 6,472,885 | B1 | 10/2002 | Green et al. |
| 6,486,795 | B1 | 11/2002 | Sobel |
| 6,512,461 | B1 | 1/2003 | Benzie et al. |
| RE37,986 | E | 2/2003 | Heitschel et al. |
| 6,525,645 | B2 | 2/2003 | King |
| 6,529,556 | B1 | 3/2003 | Perdue et al. |
| 6,542,076 | B1 | 4/2003 | Joao |
| 6,556,681 | B2 | 4/2003 | King |
| 6,556,813 | B2 | 4/2003 | Tsui |
| 6,559,775 | B1 | 5/2003 | King |
| 6,590,505 | B1 | 7/2003 | Matsui et al. |
| 6,597,291 | B2 | 7/2003 | Tsui |
| 6,597,374 | B1 | 7/2003 | Baker et al. |
| 6,292,230 | B1 | 9/2003 | Shui et al. |
| 6,634,408 | B2 | 10/2003 | Mays |
| 6,661,350 | B1 | 12/2003 | Rohrberg et al. |
| 6,690,796 | B1 | 2/2004 | Farris et al. |
| 6,703,941 | B1 | 3/2004 | Blaker |
| 6,724,339 | B2 | 4/2004 | Conway et al. |
| 6,747,568 | B1 | 6/2004 | Teskey |
| 6,759,943 | B2 | 7/2004 | Lucy et al. |
| 6,774,813 | B2 | 8/2004 | van Ee et al. |
| 6,791,467 | B1 | 9/2004 | Ben Ze'ev |
| 6,810,123 | B2 | 10/2004 | Farris et al. |
| 6,822,603 | B1 | 11/2004 | Crimmins et al. |
| 6,903,650 | B2 | 6/2005 | Murray |
| 6,956,460 | B2 | 10/2005 | Tsui |
| 6,963,267 | B2 | 11/2005 | Murray |
| 6,975,203 | B2 | 12/2005 | Brookbank et al. |
| 2001/0007086 | A1 | 7/2001 | Rogers et al. |
| 2002/0034303 | A1 | 3/2002 | Farris |
| 2002/0067826 | A1 | 6/2002 | King |
| 2002/0075133 | A1 | 6/2002 | Flick |
| 2002/0126037 | A1 | 9/2002 | Fitzgibbon |
| 2002/0137479 | A1 | 9/2002 | Tsui |
| 2002/0140569 | A1 | 10/2002 | Van Ee et al. |
| 2002/0163440 | A1 | 11/2002 | Tsui |
| 2002/0190872 | A1 | 12/2002 | Suman |
| 2002/0191794 | A1 | 12/2002 | Farris |
| 2002/0197955 | A1 | 12/2002 | Witkowski |
| 2003/0016119 | A1 | 1/2003 | Teich |
| 2003/0016139 | A1 | 1/2003 | Teich |
| 2003/0033540 | A1 | 2/2003 | Fitzgibbon |
| 2003/0067394 | A1 | 4/2003 | Tsui |
| 2003/0076235 | A1 | 4/2003 | Tsui |
| 2003/0085798 | A1 | 5/2003 | Castro |
| 2003/0112121 | A1 | 6/2003 | Wilson |
| 2003/0118187 | A1 | 6/2003 | Fitzgibbon |
| 2003/0153306 | A1 | 8/2003 | Study et al. |
| 2003/0160704 | A1* | 8/2003 | Piper et al. ............. 340/825.72 |
| 2003/0189530 | A1 | 10/2003 | Tsui |
| 2003/0197594 | A1 | 10/2003 | Olson |
| 2003/0197595 | A1 | 10/2003 | Olson |
| 2003/0216139 | A1 | 11/2003 | Olson |
| 2003/0228879 | A1 | 12/2003 | Witkowski |
| 2004/0017292 | A1 | 1/2004 | Reese et al. |
| 2004/0048622 | A1 | 3/2004 | Witkowski et al. |
| 2004/0061591 | A1 | 4/2004 | Teich |
| 2004/0066936 | A1 | 4/2004 | Farris et al. |
| 2004/0100391 | A1 | 5/2004 | Guthrie |
| 2004/0110472 | A1 | 6/2004 | Witkowski et al. |
| 2004/0207537 | A1 | 10/2004 | Keller, Jr. et al. |
| 2004/0243813 | A1 | 12/2004 | Farris et al. |
| 2005/0024184 | A1 | 2/2005 | Chuey |
| 2005/0024185 | A1 | 2/2005 | Chuey |
| 2005/0024229 | A1 | 2/2005 | Chuey |
| 2005/0024230 | A1 | 2/2005 | Chuey |
| 2005/0024254 | A1 | 2/2005 | Chuey |
| 2005/0024255 | A1 | 2/2005 | Chuey |
| 2005/0026601 | A1 | 2/2005 | Chuey |
| 2005/0026602 | A1 | 2/2005 | Chuey |
| 2005/0026605 | A1 | 2/2005 | Guthrie |
| 2005/0046545 | A1 | 3/2005 | Skekloff et al. |
| 2006/0181428 | A1* | 8/2006 | Blaker et al. ........... 340/825.22 |
| 2006/0217850 | A1 | 9/2006 | Geerlings et al. |
| 2006/0232376 | A1 | 10/2006 | Blaker |
| 2006/0234670 | A1 | 10/2006 | Blaker et al. |

FOREIGN PATENT DOCUMENTS

| | | | |
|---|---|---|---|
| EP | 0 372 285 | A1 | 6/1990 |
| EP | 0 670 402 | A1 | 9/1995 |
| EP | 1 052 608 | A1 | 11/2000 |
| EP | 1 129 441 | B1 | 9/2001 |
| FR | 2 792 444 | | 10/2000 |
| GB | 2171545 | A | 8/1986 |

| | | | |
|---|---|---|---|
| GB | 2 182 790 | A | 10/1986 |
| GB | 2 265 482 | A | 9/1993 |
| GB | 2 302 751 | A | 6/1996 |
| GB | 2 325 552 | | 11/1998 |
| GB | 2 336 433 | | 4/1999 |
| GB | 2335773 | A | 9/1999 |
| GB | 2 366 433 | A1 | 5/2000 |
| KR | 2002078726 | | 10/2002 |
| WO | WO 94/02920 | | 7/1993 |
| WO | WO 94/18036 | A1 | 8/1994 |
| WO | WO 99/63308 | A | 9/1999 |
| WO | WO 99/64274 | A1 | 12/1999 |
| WO | WO 00/12850 | A1 | 3/2000 |
| WO | WO 00/29699 | | 5/2000 |
| WO | WO 00/70577 | | 11/2000 |
| WO | WO 02/080129 | A2 | 10/2002 |
| WO | WO 2004/034352 | | 4/2004 |
| WO | WO 2004/036526 | | 4/2004 |
| WO | WO 2004/043750 | A2 | 5/2004 |
| WO | WO 2004/066514 | | 8/2004 |
| WO | WO 2004/077729 | A2 | 9/2004 |
| WO | WO 2004/104966 | A2 | 12/2004 |
| WO | WO 2004/104966 | A3 | 12/2004 |
| WO | WO 2005/002080 | | 1/2005 |

OTHER PUBLICATIONS

"Marantec Expands Its Line of Radio Controls by Introducing the HomeLink compatible 315MHz Modular Frequency System," Marantec America News, Sep. 30, 2002, 3 pages.

Photo Modules for PCM Remote Control Systems, Vishay, TSPO22, Document No. 82095, Rev. 4, Mar. 30, 2001, 7 pages.

IP Receiver for High Data Rate PCM at 455 kHz, Vishay TSPO7000, Document No. 82147, Rev. 4, Mar. 29, 2001, 7 pages.

Garage Door/Gate Remote Control User's Instructions (Model 39), Skylink Technologies Inc., 2002.

HomeLink Wireless Control System Lighting Kit Installation, http://www.homelink.com/print/lighting_print.html, Jan. 28, 2003.

HomeLink Wireless Control System Frequently Asked Questions, http://www.homelink.com/print/faq_print.html, Jan. 28, 2003.

HomeLink Universal 2 Channel Receiver Model PR433-2, Installation Instructions, 114A2437, 2000.

Microchip HCS360 Keeloq Code Hopping Encoder, Microchip Technology Inc., DS40152E, 2002.

Microchip TB003, An Introduction to Keeloq Code Hopping, Microchip Technology Inc., DS91002A, 1996.

Chamberlain LiftMaster Professional Universal Receiver Model 635LM Owner's Manual, 114A2128C, The Chamberlain Group, Inc., 2002.

Flash2Pass eliminates past garage door opener hassles using a secure and easy-to-install system, Press Release, F2P Electronics, Inc., Jan. 2002.

Neural Networks for ECCM, Simon Haykin, McMaster University Communications Research Laboratory Technical Report 282, Neurocomputing for Signal Processing, Feb. 1994, http://www.crl.mcmaster.ca/cgi-bin/makerabs.pl?282.

DRFM Theory of Operation, KOR Electronics, Inc., http://www.korelectronics.com/product_sheets/theory-of-operations/drfm-theoryofop.htm, Nov. 23, 2002.

Fabrication Process Combines Low Cost and High Reliability, Murat Eron, Richard J. Perko and R. James Gibson, Microwaves & RF, Oct. 1993.

Pager and Garage Door Opener Combination, Gail Marino, Motorola Technical Developments, vol. 10, Mar. 1990.

Search and Examination Report Under Sections 17 and 18(3), mailed Sep. 25, 2003 for the corresponding European patent application GB 0308919.0.

Combined Search and Examination Report Under 37 Sections 17 and 18(3) mailed Nov. 30, 2004 for the corresponding European patent application GB 0415908.3.

Combined Search and Examination Report Under Sections 17 and 18(3) mailed Nov. 2, 2004 for European patent application GB 0416753.2.

Combined Search and Examination Report Under Sections 17 and 18(3) mailed Nov. 2, 2004 for European patent application GB 0416789.6.

Combined Search and Examination Report Under Sections 17 and 18(3) for European Application No. GB 0416742.5 dated Oct. 26, 2004.

German Search/Examination Document, German Patent Application No. 103 14 228.2, Dec. 14, 2004.

* cited by examiner

APPLIANCE REMOTE CONTROL HAVING SEPARATED USER CONTROL AND TRANSMITTER MODULES REMOTELY LOCATED FROM AND DIRECTLY CONNECTED TO ONE ANOTHER

CROSS-REFERENCE TO RELATED APPLICATIONS

This application is a continuation-in-part of U.S. application Ser. No. 10/630,173, filed Jul. 30, 2003, now U.S. Pat. No. 7,183,941, which is hereby incorporated by reference in its entirety.

BACKGROUND OF THE INVENTION

1. Field of the Invention

The present invention relates to wireless remote control of an appliance such as a garage door opener (GDO).

2. Background Art

Appliances such as garage door openers, security gates, home alarms, lighting, and the like may conveniently be activated from a remote control. Typically, a remote control is purchased together with an appliance. The remote control transmits a radio frequency (RF) appliance activation signal recognized by a receiver associated with the appliance to activate the appliance.

An aftermarket remote control provides another remote control, in addition to the original remote control, for activating the appliance. Aftermarket remote controls include remote garage door openers integrated into automotive vehicles. Typical integrated remote controls include universal or programmable garage door openers which learn, from the original remote control or an existing transmitter, about the appliance activation signal used to activate the appliance. As such, typical integrated remote controls include a RF receiver and a RF transmitter. In a learn or programming mode, the receiver receives the appliance activation signal used to activate the appliance from the original remote control or the existing transmitter to learn the characteristics of the appliance activation signal. In a normal operation mode, the transmitter transmits an appliance activation signal having the learned characteristics to the appliance receiver to activate the appliance. Typical integrated remote controls include user controls (e.g., buttons, switches, etc.) which a user actuates to place the remote control into the learn or programming mode and to activate its transmitter to transmit appliance activation signals.

A problem with typical integrated remote controls is the difficulty experienced by users in programming such remote controls. For instance, a user has to physically locate the receiver of the remote control and either the original remote control or the existing transmitter close enough to one another to enable the receiver of the remote control to receive the appliance activation signal from the original remote control or the existing transmitter.

Another problem with typical integrated remote controls is that the receiver, transmitter, and user controls are packaged as a single unit as a result of the receiver and transmitter sharing the same RF components, the requirement of the user having to have access to the receiver to physically locate the receiver close enough to the original remote control or the existing transmitter for the learn or programming mode, and the requirement of the user having to have access to the user controls. The last requirement requires that the user controls be placed near the vehicle driver's seat such as in overhead consoles and visors where space is at a premium. As such, this last requirement causes an additional problem in that the receiver and transmitter also have to be placed near the vehicle driver's seat where space is at a premium as they are physically packaged together with the user controls. Accordingly, the receiver, transmitter, and user controls are packaged together as a single unit resulting in sub-optimal placement of the components as they are physically located together and near the vehicle driver's seat and further resulting in a relatively large amount of premium space being consumed as the single unit package has a relatively large size.

SUMMARY OF THE INVENTION

The present invention provides a universal remote control having a user control and a transmitter in which the remote control is programmable in such a way that the remote control does not have a radio frequency (RF) receiver and is relatively easier for a user to program and in which the user control and the transmitter are remotely located from one another and directly connected to one another by a wired connection, such as wiring or a part of a vehicle wiring harness, dedicated to the remote control.

The present invention provides a vehicle-based programmable appliance control system. The system includes a user control module and a transmitter module. The modules are remotely located from one another (i.e., the modules are separated from one another). For example, the user control module is located within a vehicle at a location where space is at a premium (such as near the driver's seat within the vehicle interior) whereas the transmitter module is located at a different vehicle location where space is not at a premium and is conducive for the transmitter module to conduct RF communications. The user control module includes a user control such as buttons, switches, etc. The transmitter module includes a RF transmitter. A wired connection, such as a ribbon cable, wiring, or a part of the vehicle wiring harness, directly connects the modules. The wired connection between the modules is disconnected from any other devices (i.e., the wired connection is not connected to any other devices). As such, the wired connection is solely dedicated to the remote control. The user control module transmits over the wired connection a user activation signal based on assertion of the user control to the transmitter module for receipt by the transmitter. The transmitter transmits an RF appliance activation signal based on the received user activation signal.

The user control module may receive electrical power from another part of the vehicle wiring harness for its operation. In turn, the user control module supplies some of the received power over the wired connection to the transmitter module for its operation.

The transmitter module may include memory holding a plurality of appliance activation schemes, each appliance activation scheme providing characteristics for generating at least one appliance activation signal. In this case, the memory may receive data modifying the appliance activation schemes from a data port communicable with the transmitter module.

The present invention provides a method of activating a remotely controlled appliance. An activation input is received from a user in response to the user actuating a user control of a user control module. A signal representing the activation input is transmitted from the user control module to a transmitter module, remotely located from the user control module, through a wired connection directly connecting the modules. As such, the signal is received by the transmitter module from the wired connection at a location remote from where the activation input was received. An appliance activation signal based on the received signal is transmitted by a RF transmitter of the transmitter module.

The present invention provides a method of programming a vehicle-based remote control. When programmed, the remote control is operative to transmit at least one appliance activation signal for activating a remotely controlled appliance. A programming input is received from a user in response to the user actuating a user control of a user control module. The programming input specifies at least one of a plurality of appliance activation signal characteristics. A programming signal representing the programming input is transmitted from the user control module to a transmitter module through a wired connection directly connecting the modules. The modules are remotely located from one another. As such, the programming signal is received by the transmitter module from the wired connection at a location remote from where the programming input was received. A RF appliance activation signal based on the received programming signal is transmitted from a transmitter of the transmitter module.

The programming input may include at least one of a fixed code value, a selection of one of a plurality of appliance activation transmission schemes, and an indication of whether the remotely controlled appliance is responsive to a fixed code appliance activation signal or to a rolling code appliance activation signal.

The present invention provides a vehicle-based remote garage door opener (GDO). The GDO includes a wired connection having first and second ends. A user control is connected to one end of the wired connection. A RF transmitter, operable to transmit at least one of a plurality of different appliance activation signals, is connected to the other wired connection end such that the transmitter is remotely located from the user control. The transmitter transmits at least one appliance activation signal based on a user signal received over the wired connection from the user control.

The present invention provides a programmable control for an appliance responsive to one of a plurality of transmission schemes. The programmable control includes a wired connection having first and second ends, a user programming control connected to the first wired connection end, and a transmitter connected to the second wired connection end such that the transmitter is remotely located from the user programming control. The transmitter is operative to transmit a RF appliance activation signal based on any of the transmission schemes. The transmitter implements a rolling code programming mode, a fixed code programming mode, and an operating mode. In the rolling code programming mode, the transmitter generates and transmits a sequence of rolling code appliance activation signals until user input indicating a successful rolling code transmission scheme is received by the transmitter from the user programming control over the wired connection. In the fixed code programming mode, the transmitter receives a fixed code from the user programming input over the wired connection and then generates and transmits a sequence of fixed code appliance activation signals until user input indicating a successful fixed code transmission scheme is received by the transmitter from the user programming control over the wired connection.

The present invention provides a programable control for an appliance responsive to one of a plurality of transmission schemes. The programmable control includes a wired connection having first and second ends, a user programming input connected to the first wired connection end, and a transmitter connected to the second wired connection end such that the transmitter is remotely located from the user programming input. The transmitter is operative to transmit a RF appliance activation signal based on any of the transmission schemes. The transmitter has memory holding data describing a plurality of rolling code transmission schemes associated with a rolling code mode and a plurality of fixed code transmission schemes. At least one fixed code transmission scheme is associated with each of at least one fixed code mode. For each of at least one channel, the transmitter maintains a channel mode set initially to the rolling code mode. The channel mode changes to one of the at least one fixed code mode if the channel is trained to a fixed code received by the transmitter from the user programming input over the wired connection.

The present invention provides a programmable control for an appliance responsive to one of a plurality of transmission schemes. The programmable control includes a wired connection having first and second ends, a user control module connected to the first wired connection end, and a transmitter module connected to the second wired connection end such that the transmitter module is remotely located from the user control module. The user control module has a plurality of user activation inputs which each generate an activation signal when asserted. The transmitter module has a RF transmitter operative to transmit an activation signal. The transmitter module has memory holding data describing each of the plurality of transmission schemes. The transmitter is programmed to associate each of the activation inputs with at least one of the transmission schemes. The transmitter generates and transmits an activation signal based on each of the at least one associated transmission scheme in response to receiving an activation signal from an asserted user activation input over the wired connection.

In general, a remote control in accordance with the present invention has user controls (e.g., buttons and switches) separated from RF circuitry in which the user controls and the RF circuitry are part of respective user control and transmitter modules and in which the modules are directly connected to one another by a wired connection such as a vehicle wiring harness. As such, the remote control is different than typical remote controls which keep the user controls on the same board as the RF circuitry (i.e., the user controls and the RF circuitry are co-located with one another). Further, the remote control having user control and transmitter modules remotely located from and directly connected to one another is enabled by the operation and training of the remote control as described herein. Such operation and training is different from that of typical remote controls. Hence, typical remote controls co-locate the user controls and the RF circuitry in a single module, typically at a location where space is at a premium.

The remote control in accordance with the present invention provides many advantages such as more flexibility in location placement of the user controls due to a smaller package of the user control module. The transmitter module can be placed in a location that provides optimum performance without the constraints of being conveniently accessible. More particularly, by separating the remote control into separate operating units (i.e., user control module and RF transmitter module), the transmitter module can be placed in a location optimal for RF transmission and the user control module can be placed in a convenient location for the vehicle driver without having to compromise or compete for larger packaging space. As such, the two module design makes it possible to develop a common transmitter module usable across many different platforms while developing a smaller user control module (i.e., a smaller button array) that provides more styling freedoms and more choices for location.

In general, in a vehicle, space is at a premium in the overhead consoles and visors, and mirrors that dictate special module designs to fit into the available spaces. The detached user control and transmitter modules design in accordance with the present invention requires much less packaging space thus making it easier to locate the user control module where space is an issue while locating the transmitter module in a remote location where space is not an issue. As such, for a vehicle, the remote control in accordance with the present invention provides styling flexibility and reduces packaging constraints in highly congested areas such as visors, overhead consoles, and mirrors.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
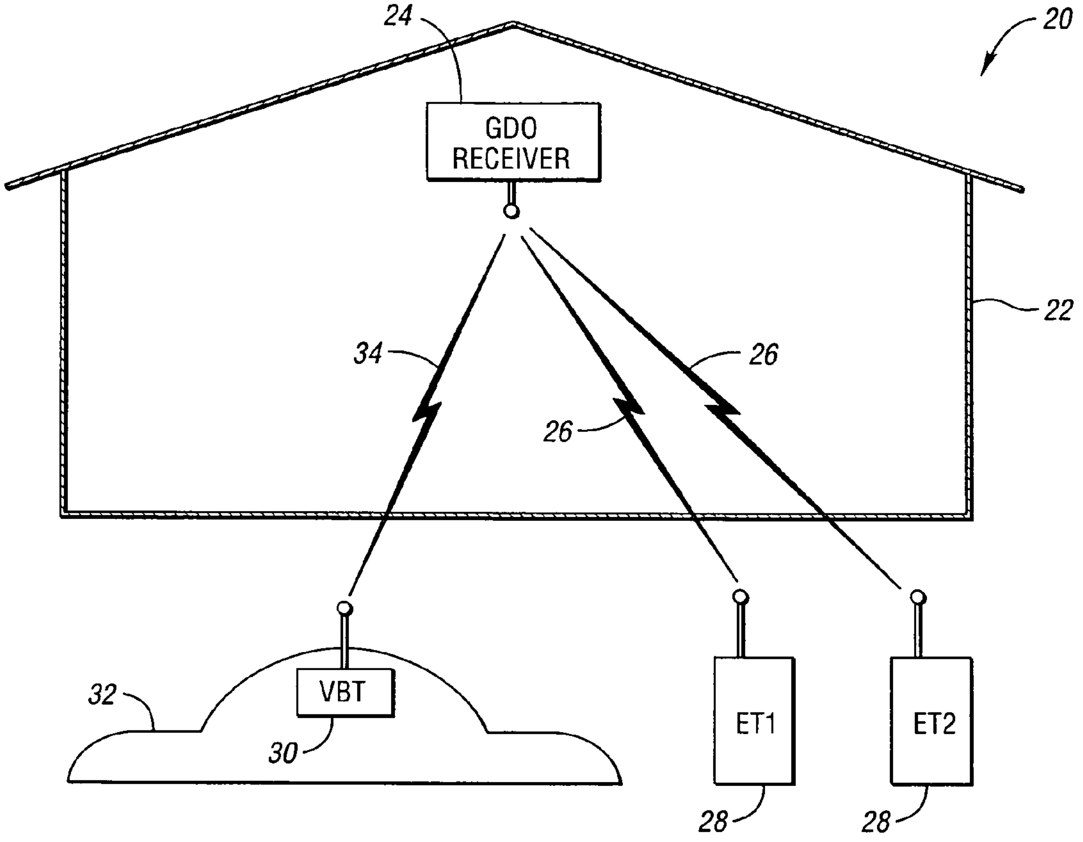
FIG. 1 illustrates a block diagram of an appliance control system in accordance with an embodiment of the present invention.

Referring now to FIG. 1, a block diagram illustrating an appliance control system 20 according to an embodiment of the present invention is shown. Appliance control system 20 allows one or more appliances to be remotely controlled using radio transmitters. In the example shown, radio frequency (RF) remote controls are used to operate a garage door opener (GDO). However, the present invention may be applied to controlling a wide variety of appliances such as other mechanical barriers, lighting, alarm systems, temperature control systems, etc.

Appliance control system 20 includes garage 22 having a garage door (not shown). A GDO receiver 24 receives RF appliance activation signals 26 for activating the garage door. Appliance activation signals 26 have a transmission scheme which may be represented as a set of receiver characteristics. One or more existing transmitters (ET) 28 generate appliance activation signals 26 exhibiting the receiver characteristics in response to a user depressing an activation button of the existing transmitter.

A user of appliance control system 20 may wish to add a new transmitter to the system. For example, a vehicle-based transmitter (VBT) including programable remote control 30 may be installed in vehicle 32, which may be parked in garage 22. In accordance with the present invention, remote control 30 transmits a sequence of RF appliance activation signals 34 which includes an appliance activation signal having characteristics appropriate to activate GDO receiver 24. In the embodiment shown, remote control 30 is mounted in vehicle 32. However, the present invention applies to universal remote controls that may be mounted anywhere.

Figure 2:
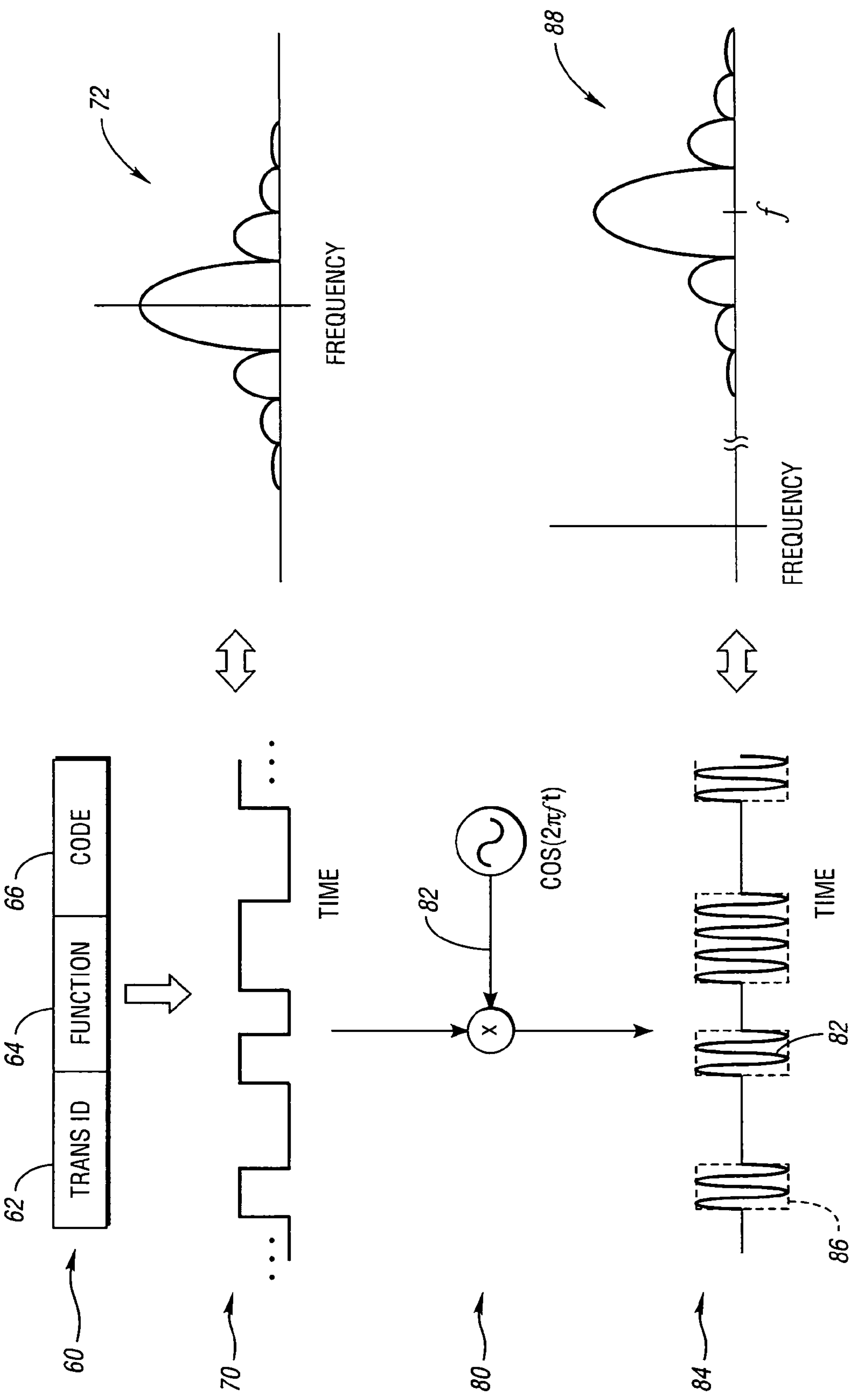
FIG. 2 illustrates a schematic diagram of appliance activation signal characteristics in accordance with embodiment of the present invention.

Referring now to FIG. 2, a schematic diagram illustrating appliance activation signal characteristics according to an embodiment of the present invention is shown. Information transmitted in an activation signal is typically represented as a binary data word 60. Data word 60 may include one or more fields, such as transmitter identifier 62, function indicator 64, code word 66, and the like. Transmitter identifier (TRANS ID) 62 uniquely identifies a remote control transmitter. Function indicator 64 indicates which of a plurality of functional buttons on the remote control transmitter were activated. Code word 66 helps to prevent misactivation and unauthorized access.

Several types of codes 66 are possible. One type of code is a fixed code, wherein each transmission from a given remote control transmitter contains the same code 66. In contrast, variable code schemes change the bit pattern of code 66 with each activation. The most common variable code scheme, known as rolling code, generates code 66 by encrypting a synchronization (sync) counter value. After each activation, the counter is incremented. The encryption technique is such that a sequence of encrypted counter values appears to be random numbers.

Data word 60 is converted to a baseband stream 70 which is an analog signal typically transitioning between high and low voltage levels. Multilevel transmissions are also possible. Various baseband encoding or modulation schemes are known, including polar signaling, on-off signaling, bipolar signaling, duobinary signaling, Manchester signaling, and the like. Baseband stream 70 has a baseband power spectral density 72 centered around a frequency of zero.

Baseband stream 70 is converted to a RF signal through a modulation process 80. Baseband stream 70 is used to modulate one or more characteristics of carrier 82 to produce a broadband signal 84. Modulation process 80, mathematically illustrated by multiplication in FIG. 2, implements a form of amplitude modulation referred to as on-off keying. Other modulation forms are possible, including frequency modulation, phase modulation, and the like. In the example shown, baseband stream 70 forms envelope 86 modulating carrier 82. As illustrated in broadband power spectral density 88, the effect in the frequency domain is to shift baseband power spectral density 72 up in frequency so as to be centered around the carrier frequency, f, of carrier 82.

Figure 3:
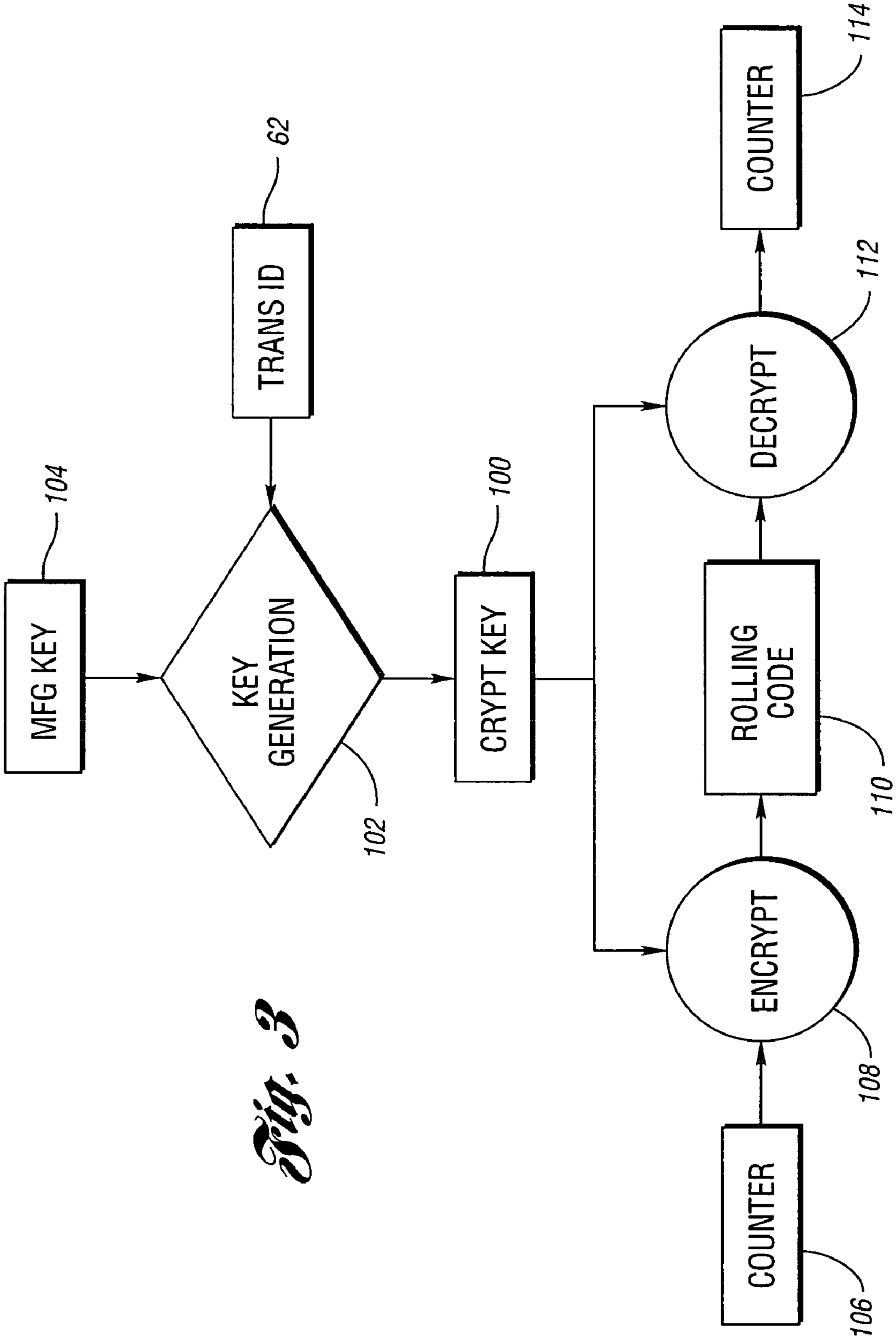
FIG. 3 illustrates a block diagram of a rolling code operation that may be used in accordance with an embodiment of the present invention.

Referring now to FIG. 3, a block diagram illustrating rolling code operation that may be used according to an embodiment of the present invention is shown. Remotely controlled systems use rolling code require crypt key 100 in both the transmitter and the receiver for normal operation. In a well-designed rolling code scheme, crypt key 100 is not transmitted from the transmitter to the receiver. Typically, crypt key 100 is generated using key generation algorithm 102 based on transmitter identifier 62 and a manufacturing (MPG) key 104. Crypt key 100 and transmitter identifier 62 are then stored in a particular transmitter. Counter 106 is initialized in the transmitter. Each time an appliance activation signal is sent, the transmitter uses encrypt algorithm 108 to generate rolling code value 110 from counter 106 using crypt key 100. The transmitted appliance activation signal includes rolling code 110 and transmitter identifier 62.

A rolling code receiver is trained to a compatible transmitter prior to normal operation. The receiver is placed into a learn mode. Upon reception of an appliance activation signal, the receiver extracts transmitter identifier 62. The receiver uses key generation algorithm 102 with manufacturing key 104 and received transmitter identifier 62 to generate crypt key 100 identical to the crypt key used by the transmitter. Newly generated crypt key 100 is used by decrypt algorithm 112 to decrypt rolling code 110, producing counter 114 equal to counter 106. The receiver saves counter 114 and crypt key 100 associated with transmitter identifier 62. Encrypt algorithm 108 and decrypt algorithm 112 may be the same algorithm.

In normal operation, when the receiver receives an appliance activation signal, the receiver first extracts transmitter identifier 62 and compares transmitter identifier 62 with all learned transmitter identifiers. If no match is found, the receiver rejects the appliance activation signal. If a match is found, the receiver retrieves crypt key 100 associated with received transmitter identifier 62 and decrypts rolling code 110 from the received appliance activation signal to produce counter 114. If received counter 106 matches counter 114 associated with transmitter identifier 62, activation proceeds. Received counter 106 may also exceed stored counter 114 by a preset amount for successful activation.

Another rolling code scheme generates crypt key 100 based on manufacturing key 104 and a "seed" or random number. An existing transmitter sends this seed to an appliance receiver when the receiver is placed in learn mode. The transmitter typically has a special mode for transmitting the entered seed, for example, by pushing a particular combination of buttons. The receiver uses the seed to generate crypt key 100. The present invention applies to the use of a seed for generating a crypt key as well as to any other variable code scheme.

Figure 4:
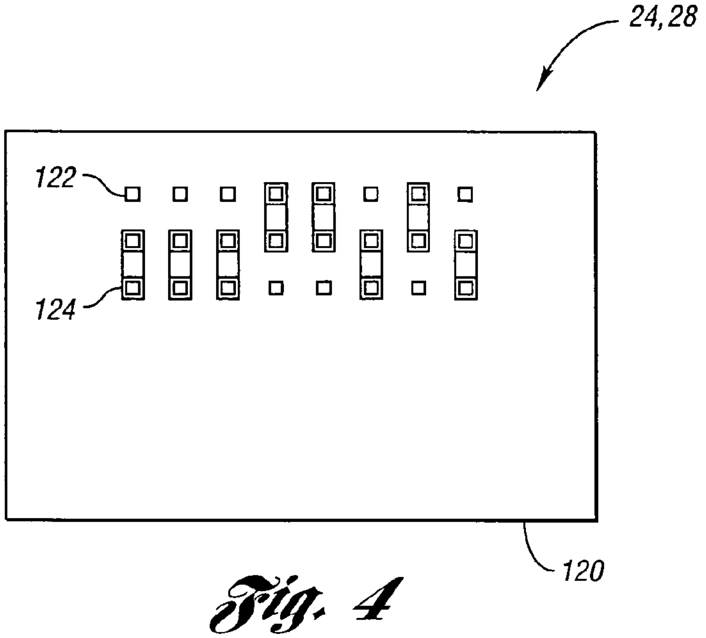
FIG. 4 illustrates a schematic diagram of a fixed code setting which may be used in accordance with an embodiment of the present invention.

Referring now to FIG. 4, a schematic diagram illustrating a fixed code setting which may be used according to an embodiment of the present invention is shown. Fixed code systems typically permit a user to set the fixed code value through a set of DIP switches or jumpers. For example, fixed code receiver 24 and transmitter 28 may each include printed circuit board 120 having a plurality of pins 122 together with support electronics. Pins 122 are arranged in a grid having three rows and a number of columns equal to the number of bits in the fixed code value. A jumper 124 is placed in each column straddling either the first and second pins or the second and third pins. One position represents a logical "1" and the other position represents a logical "0." Various alternative schemes are possible. For example, two rows may be used, with the presence or absence of jumper 124 indicating one of the logical binary values. As another alternative, a set of DIP switches may be used with "up" representing one binary value and "down" representing the other.

In various embodiments of the present invention, a user is asked to read the fixed code value from existing transmitter 28 or appliance receiver 24 and enter this fixed code value into programmable remote control 30. A difficulty experienced by users asked to read such values is in determining from which end to start. Another difficulty is in determining which setting represents a binary "1" and which setting represents a binary "0." For example, the pattern represented in FIG. 4 may be interpreted as "00011010," "11100101," "01011000" or "10100111." Entering an incorrect value can frustrate a user who is not sure why he cannot program his fixed code transmitter. To rectify this situation, embodiments of the present invention may transmit fixed code appliance activation signals based on the fixed code value as entered by the user and at least one of a bitwise reversal of the fixed code, a bitwise inversion of the fixed code, and both a bitwise reversal and inversion.

Figure 5A:
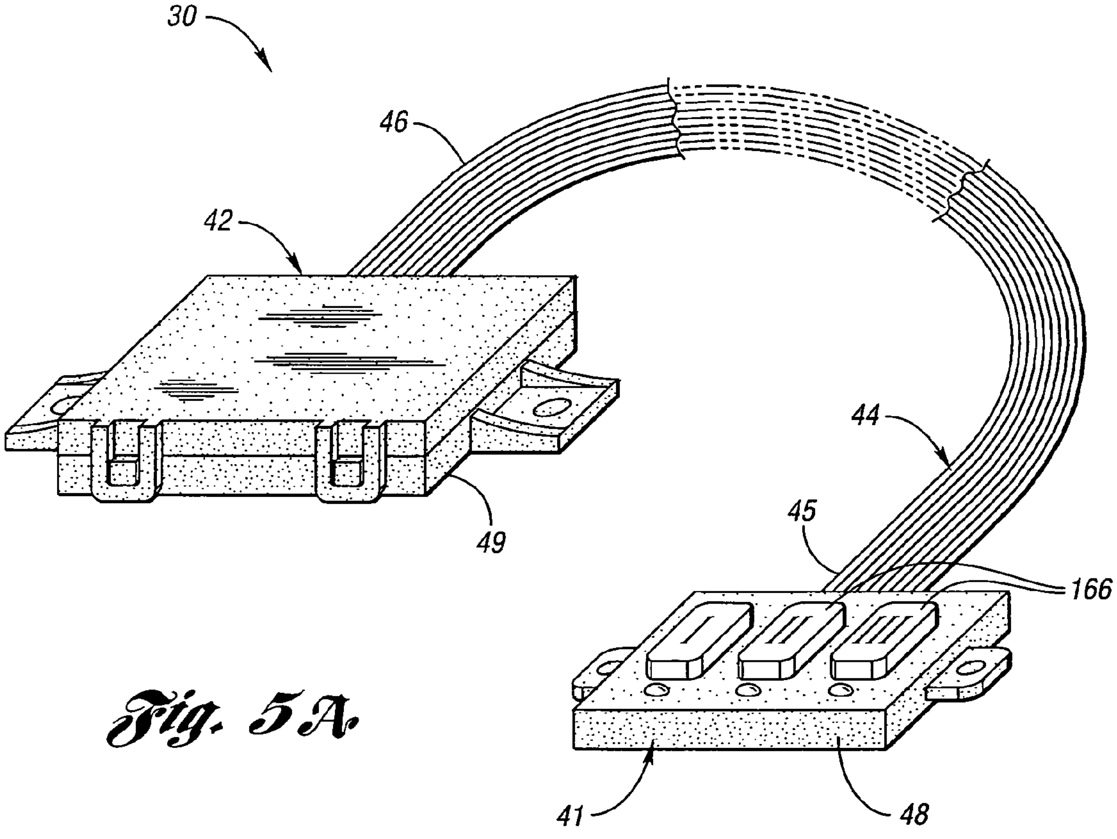
FIG. 5A illustrates a perspective view of a programmable remote control having a user control module and a transmitter module remotely located from and directly connected to one another by a wired connection in accordance with an embodiment of the present invention.
Figure 5B:
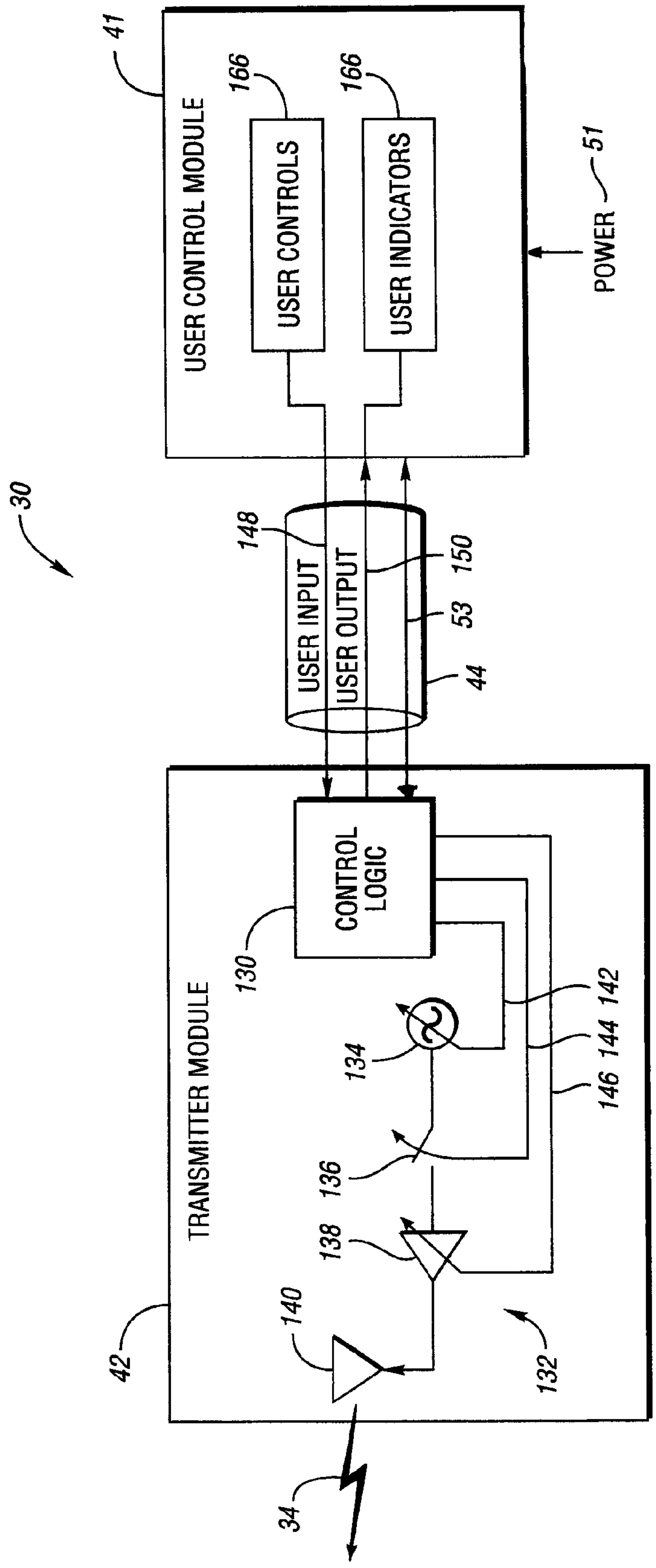
FIG. 5B illustrates a block diagram of the programmable remote control shown in FIG. 5A.

Referring now to FIGS. 5A and 5B, a perspective view and a block diagram of a programmable remote control 30 in accordance with an embodiment of the present invention are respectively shown. Remote control 30 includes two modules: a user control module 41 and a transmitter module 42. Modules 41, 42 are separated and remotely located from one another. Remote control 30 includes a wired connection 44 having first and second ends 45, 46. Wired connection 44 may be an individual wire, cable, ribbon cable, etc., or part of the wiring of a vehicle wiring harness. User control module 41 is connected to first wired connection end 45 and transmitter module 42 is connected to second wired connection end 46. As such, wired connection 44 directly connects modules 41, 42 together and is solely dedicated to the modules as the wired connection is not connected to any other devices.

User control module 41 and transmitter module 42 include respective housings 48 and 49. Housings 48, 49 have mounting tabs (as shown in FIG. 5A) or the like for respectively mounting modules 41, 42 to respective locations.

User control module 41 includes user controls (i.e., activation inputs) 166 such as buttons, switches, etc. User controls 166 extend out of housing 48 to be accessible to a user. User controls 166 are connected to user control circuitry (not shown) mounted on a circuit board or the like within housing 48. The user control circuitry generates respective user activation input signals 148 upon assertion of user controls 166 by a user. For instance, the user control circuitry generates a first user activation input signal 148 upon assertion of a first one of user controls 166 and generates a different user activation input signal 148 upon assertion of a different one of user controls 166. In accordance with embodiments of the present invention, the user control circuitry (i.e., user control module 41) transmits user activation input signals 148 over wired connection 44 to transmitter module 42.

Transmitter module 42 includes a radio frequency (RF) transmitter 132 operative to transmit each appliance activation signal in sequence of appliance activation signals 34. In general, transmitter 132 transmits appliance activation signals 34 based on user activation input signals 148 received by transmitter module 42 from user control module 41 via wired connection 44.

As indicated above, modules 41, 42 are remotely located from one another and are located at different positions. For instance, user control module 41 is located within a vehicle interior at a position adjacent to the vehicle driver's seat such as in an overhead console, visor, etc. The area near the vehicle driver's seat is a premium space in that other elements, devices, etc., need to be located in this area. User control module 41 is located near the vehicle driver's seat as user controls 166 are to be readily accessible to the vehicle driver. A vehicle driver does not need frequent access to transmitter module 42. As such, transmitter module 42 can be placed in vehicle areas where space is not at a premium. As such, transmitter module 42 is located at a different area of the vehicle which is conducive for transmitter 132 to transmit RF appliance activation signals 34.

User control module 41 includes user indicators 168 such as lamps or the like. User indicators 168 are part of the user control circuitry and visually convey information to a user regarding the status of remote control 30.

Transmitter module 42 includes transmitter circuitry (not shown) mounted on a circuit board or the like within housing 49. The transmitter circuitry includes transmitter 132 and control logic 130. Notably, the transmitter circuitry is void of RF receiver circuitry as such circuitry is not needed for programming remote control 30 (i.e., remote control 30 does not wirelessly receive appliance activation signal 26 to learn about the appliance activation signal).

Transmitter 132 includes variable frequency oscillator 134, modulator 136, variable gain amplifier 138, and antenna 140. For each appliance activation signal in sequence of appliance activation signals 34, control logic 130 sets the carrier frequency of the appliance activation signal generated by variable frequency oscillator 134 using frequency control signal 142. Control logic 132 modulates the carrier frequency with modulator 136, modeled here as a switch, to produce an appliance activation signal which is amplified by variable gain amplifier 138. Modulator 136 may be controlled by shifting a data word serially onto modulation control signal 144. Other forms of modulation are possible, such as frequency modulation, phase modulation, and the like. Variable gain amplifier 138 is set to provide the maximum allowable output power to antenna 140 using gain control signal 146.

Control logic 130 accesses a memory, which holds a plurality of appliance activation schemes. Each scheme describes appliance activation control signals used by control logic 130 to transmit appliance activation signals 34 by transmitter 132. Control logic 130 interfaces with user activation inputs and outputs 166, 168 via wired connection 44. This allows user control module 41 and transmitter module 42 to be located at different locations within vehicle 32.

Control logic 130 receives user input 148 providing fixed code programming information and/or user activation input information. User input 148 is received by control logic 130 from user control module 41 via wired connection 44. During operation of remote control 30, control logic 130 may generate user output signals 150 which are transmitted by transmitter module 42 to user control module 41 via wired connection 44. User indicators 168 are appropriately controlled in response to such user output signals 150.

User control module 41 receives electrical power 51 for its operation including operation of the user control circuitry and user indicators 168. User control module 41 receives power 51 from another part of the vehicle wiring harness connected to user control module 41. User control module 41 is connected to positive and ground wires of the other part of the vehicle wiring harness in order to receive power 51. The positive and ground wires may be hard wires and can be part of the vehicle wiring harness or a separate harness. In turn, user control module 41 supplies a portion 53 of power 51 to transmitter module 42 for its operation. User control module 41 supplies power 53 over wired connection 44 to transmitter module 42. User control module 41 is operative for conditioning power 51 into power 53 for transmitter module 42. This eliminates the possibility of cross-talk between transmitter 132 and the power lines. Wired connection 44 includes positive and ground wires such that transmitter module 42 receives power 53 from user control module 41 in a like manner as user control module 41 receives power 51. Transmitter module 42 uses power 53 for operation of transmitter 132 and control logic 130. The power reception and transmission roles of user control module 41 and transmitter module 42 may be reversed such that transmitter module 42 receives power 51 via another part of the vehicle wiring harness and then supplies power 52 to user control module 41 via wired connection 44. Alternatively, either of user control module 41 and/or transmitter module 42 may include their own power supply. In this case, modules 41, 42 which do not have their own power supply receive power from another part of the vehicle wiring harness and may condition such power as described above. It is noted that the above-described design does not require the electronics used for supporting a vehicle buss system.

Figure 6:
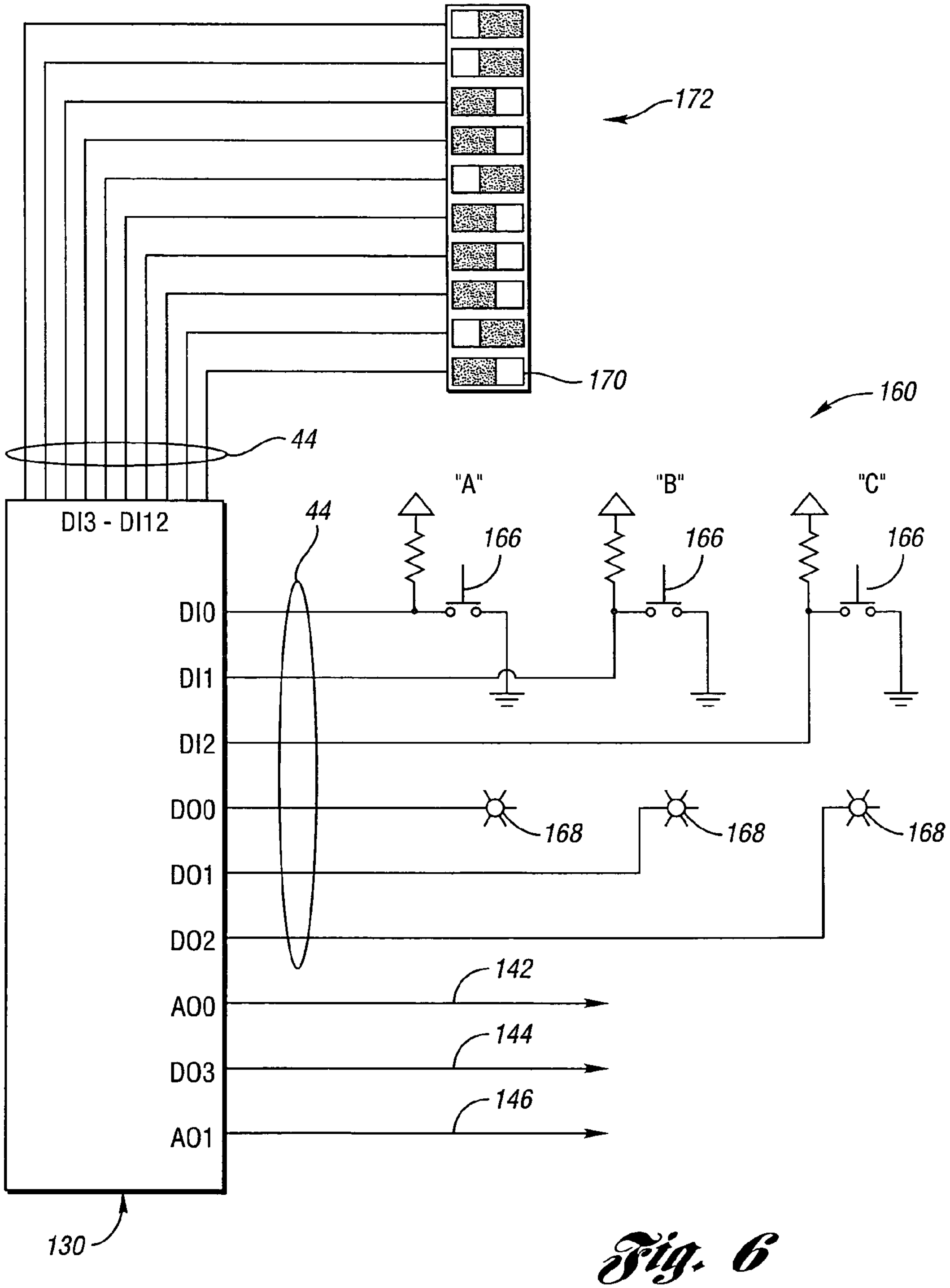
FIG. 6 illustrates a schematic diagram of (i) the user controls and the user indicators of the user control module and (ii) the control logic of the transmitter module of the programmable remote control shown in FIG. 5A.

Referring now to FIG. 6, with continual reference to FIGS. 5A and 5B, a schematic diagram illustrating control logic 130 of transmitter module 42 and a user interface 160 of user control module 41 according to an embodiment of the present invention is shown. Control logic 130 can be implemented with a micro-controller. As shown, user interface 160 of user control module 41 includes three user controls (i.e., activation inputs) 166, labeled "A," "B" and "C." Each user control 166 is implemented with a pushbutton switch. Each pushbutton switch 166 provides a voltage signal over wired connection 44 to a digital input (DI) for control logic 130. User interface 160 includes user indicators 168 such as indicator lamps respectively associated with user controls 166. Each indicator lamp 168 may be implemented using one or more light emitting diodes supplied by a digital output (DO) from control logic 130 to user control module 41 via wired connection 44.

User interface 160 can include a plurality of user control DIP switches (not shown in FIGS. 5A and 5B), one of which is indicated by 170, for implementing programming input 172. DIP switches 170 are set to match the fixed code value from fixed code appliance receiver 24 or associated existing transmitter 28. User control module 41 transmits a signal indicative of the position of DIP switches 170 over wired connection 44 for receipt by control logic 130. Alternatively, programming input 172 may be implemented using user control pushbutton switches 166 as will be described in greater detail below.

Control logic 130 generates control signals determining characteristics of transmitted appliance activation signals. Frequency control signal 142 is delivered from an analog output (AO) on control logic 130 to variable frequency oscillator 134 of transmitter 132. For example, if variable frequency oscillator 134 is implemented using a voltage controlled oscillator, varying the voltage on frequency control signal 142 controls the carrier frequency of the appliance activation signal. Frequency control signal 142 may also be one or more digital outputs used to select between fixed frequency sources. Modulation control signal 144 is provided by a digital output on control logic 130 to modulator 136 of transmitter 132. The fixed or rolling code data word is put out on modulation control 144 in conformance with the baseband modulation and bit rate characteristics of the appliance activation scheme being implemented. Control logic 130 generates gain control signal 146 for amplifier 138 of transmitter 132 as an analog output for controlling the amplitude of the appliance activation signal generated by the transmitter. Analog output signals may be replaced by digital output signals feeding an external digital-to-analog converter.

Figure 7:
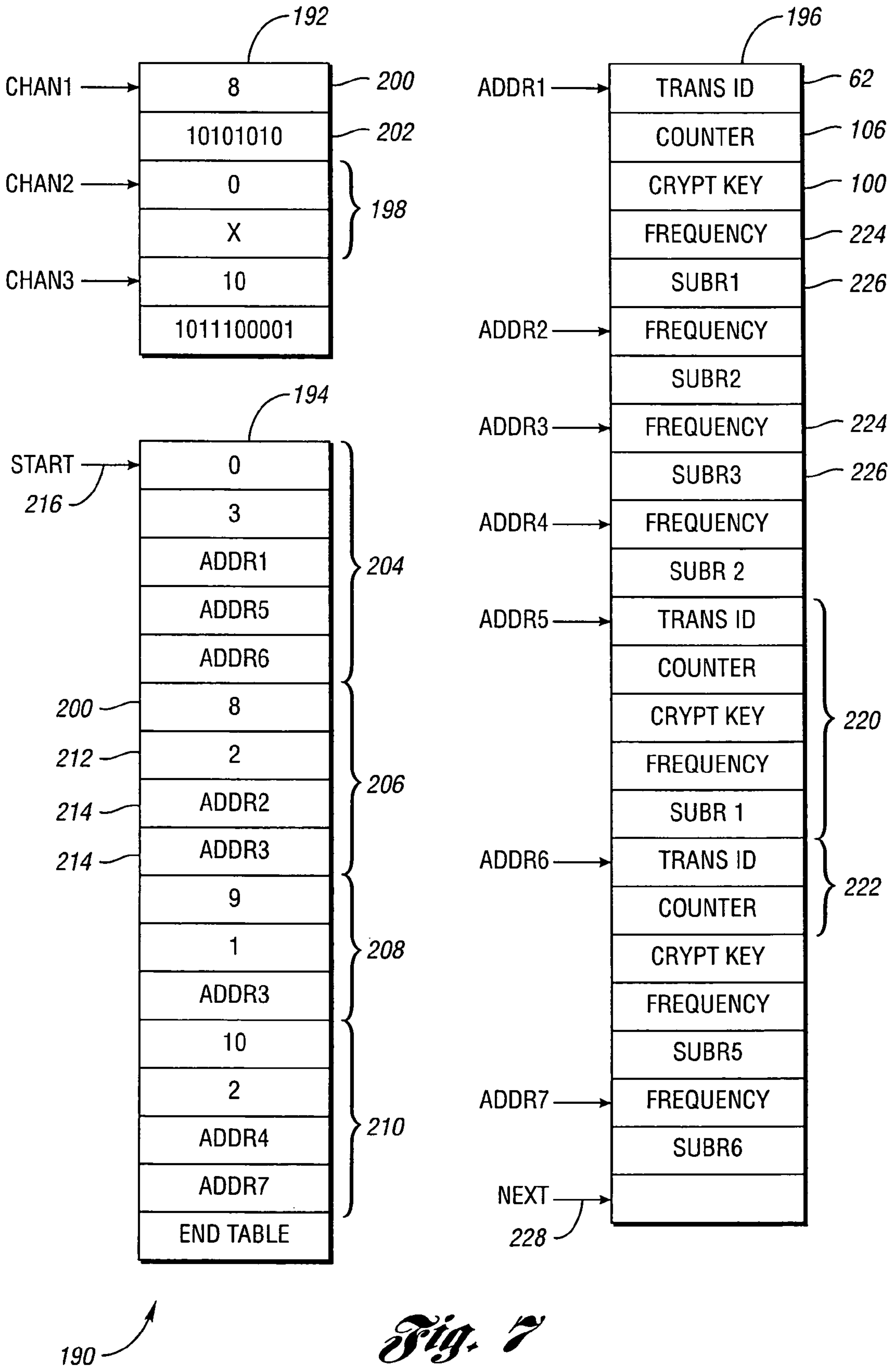
FIG. 7 illustrates a memory map for implementing control modes in accordance with an embodiment of the present invention.

Referring now to FIG. 7, a memory map 190 for implementing operating modes according to an embodiment of the present invention is shown. Memory map 190 represents the allocation of memory for data tables used by remote control 30. The data is held in non-volatile memory such as flash memory contained in transmitter module 42 and accessible to control logic 130. A data port communicable with transmitter module 42 may be used to upload code and scheme data into the memory and/or exchange data for assisting in programming remote control 30. Memory map 190 includes channel table 192, mode table 194, and scheme table 196.

Channel table 192 includes a channel entry, one of which is indicated by 198, for each channel supported by remote control 30. Typically, each channel corresponds to a user control 166. In the example illustrated in FIG. 7, three channels are supported. Each channel entry 198 has two fields, mode indicator 200 and fixed code 202. Mode indicator 200 indicates the mode programmed for that channel. In the embodiment shown, a zero in mode indicator 200 indicates rolling code mode. A non-zero integer in mode indicator 200 indicates a fixed code mode with a code size equal to the integer value. For example, the first channel (CHAN1) has been programmed for eight-bit fixed code operation, the second channel (CHAN2) has been programmed for rolling code operation, and the third channel (CHAN3) has been programmed for ten-bit fixed code operation. Fixed code value 202 holds the programmed fixed code for a fixed code mode. Fixed code value 202 may also hold function code 64 in fixed code modes. Fixed code value 202 may hold function code 64 or may not be used at all in a channel programmed for a rolling code mode.

Mode table 194 contains an entry for each mode supported. The four entries illustrated are rolling code entry 204, eight-bit fixed code entry 206, nine-bit fixed code entry 208, and ten-bit fixed code entry 210. Each entry begins with mode indicator 200 for the mode represented, the next value is scheme count 212 indicating the number of schemes to be sequentially transmitted in that mode. Following scheme count 212 is a scheme address 214 for each scheme. The address of the first entry of mode table 194 is held in table start pointer 216 known by control logic 130. When accessing data for a particular mode, control logic 130 searches through mode table 194 for mode indicator 200 matching the desired mode. The use of mode indicators 200 and scheme counts 212 provides a flexible representation for adding new schemes to each mode and adding new modes to mode table 194.

Scheme table 196 holds characteristics and other information necessary for generating each activation signal in sequence of appliance activation signals 34. Scheme table 196 includes a plurality of rolling code entries, one of which is indicated by 220, and a plurality of fixed code entries, one of which is indicated by 222. Each rolling code entry 220 includes transmitter identifier 62, counter 106, crypt key 100, carrier frequency 224, and subroutine address 226. Subroutine address 226 points to code executable by control logic 130 for generating an appliance activation signal. Additional characteristics may be embedded within this code. Each fixed code entry 222 includes carrier frequency 224 and subroutine address 226. Next pointer 228 points to the next open location after scheme table 196. Any new schemes received by control logic 130 may be appended to scheme table 196 using next pointer 228.

Memory map 190 illustrated in FIG. 7 implements a single rolling code mode and three fixed code modes based on the fixed code size. Other arrangement of modes are possible. For example, more than one rolling code mode may be used. Only one fixed code mode may be used. If more than one fixed code mode is used, characteristics other than fixed code size may be used to distinguish between fixed code modes. For example, fixed code schemes may be grouped by carrier frequency, modulation technique, baseband modulation, and the like.

In other alternative embodiments, channel table 192 can hold different values for channel entries 198. For example, each channel entry 198 could include scheme address 214 of a successfully trained scheme as well as fixed code value 202.

Referring now to FIGS. 8-16, flow charts illustrating operation of programmable remote control 30 according to embodiments of the present invention are shown. The operations illustrated are not necessarily sequential operations and may be performed by software, hardware, or a combination of both. The present invention transcends any particular implementation and the aspects are shown in sequential flowchart form for ease of illustration.

Figure 8:
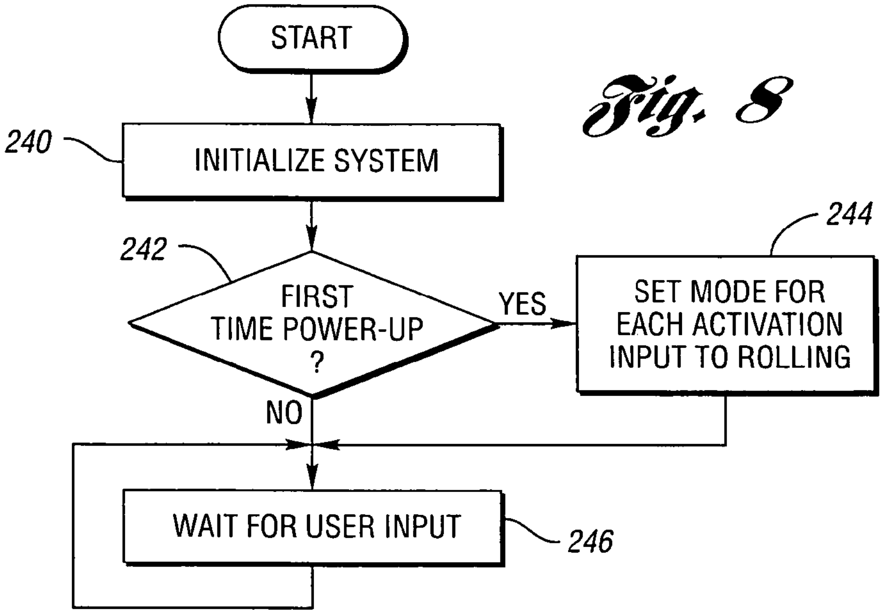
FIGS. 8, 9, 10, 11, and 12 illustrate flow diagrams of programmable remote control operation in accordance with embodiments of the present invention.

Referring now to FIG. 8, a top level flowchart is shown. System initialization occurs as shown in block 240. Control logic 130 is preferably implemented with a micro-controller. Various ports and registers are typically initialized on power up. A check is made to determine if this is a first power up occurrence as shown in block 242. If so, the mode for each channel is set to rolling code as shown in block 244. The system then waits for user input as shown in block 246. This waiting may be done either with power applied or removed.

Figure 9:
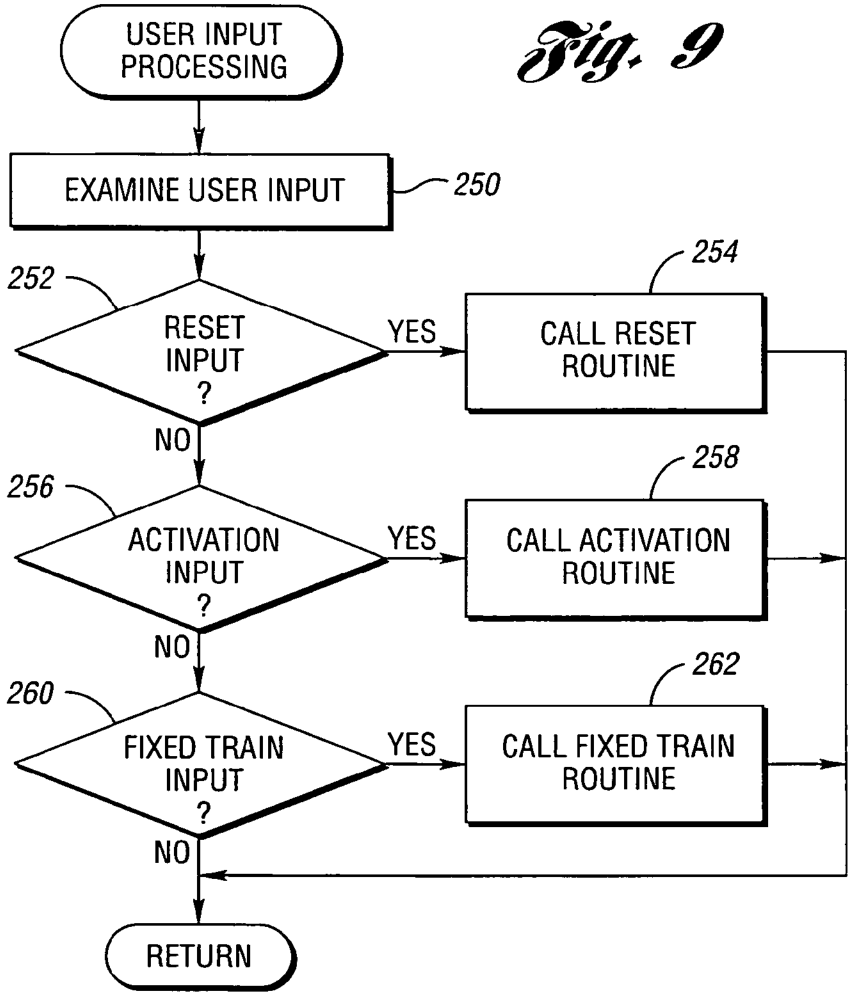

Referring now to FIG. 9, a flowchart illustrating response to user input 148 is shown. The user input is examined by control logic 130 as shown in block 250. A check is made for reset input as shown in block 252. If so, a reset routine is called as shown in block 254. If not, a check is made for activation input as shown in block 256. If so, an activation routine is called as shown in block 258. If not, a check is made to determine if fixed code training input has been received as shown in block 260. If so, a fixed code training routine is called as shown in block 262.

Interpreting user input depends upon the type of user input supported by remote control 30. For a simple pushbutton system, a button 166 depression of short duration may be used to signify activation input for the channel assigned to the button. Holding button 166 for a moderate length of time may be used to signify fixed training input. Holding button 166 for an extended period of time may be used to indicate reset input. Alternatively, different combinations of buttons 166 may be used to place remote control 30 into various modes of operation.

Figure 10:
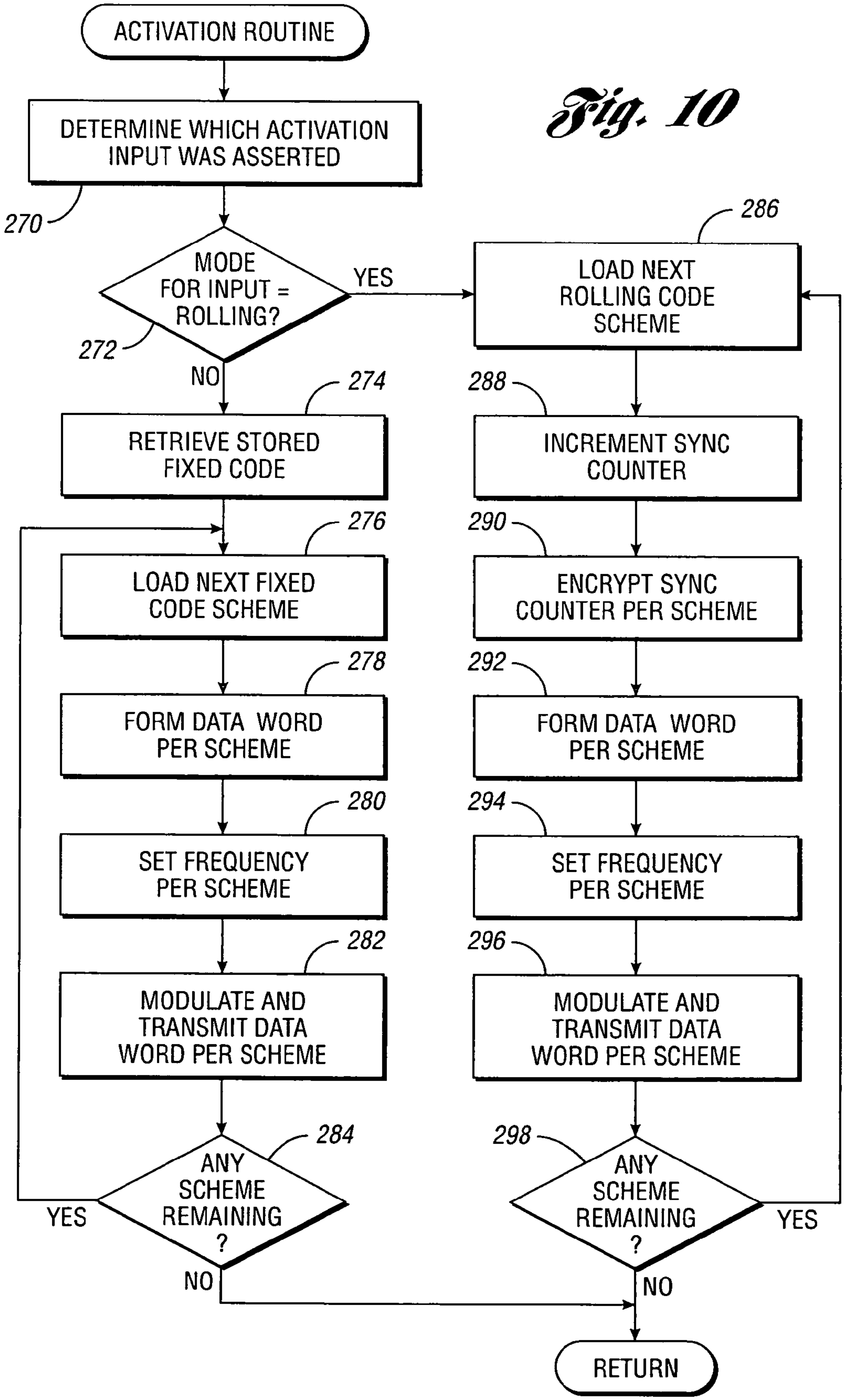

Referring now to FIG. 10, a flowchart illustrating an activation routine is shown. A determination is made as to which user control (i.e., activation input) 166 was asserted as shown in block 270. For the selected channel, a check is made to determine under which mode the activation input channel is operating as shown in block 272. This determination can be accomplished by examining channel table 192 as described above. For a fixed code mode, the stored fixed code is retrieved as shown in block 274. A loop is executed for each scheme associated with the fixed code mode. Characteristics for the next scheme are loaded as shown in block 276. This may be accomplished, for example, by obtaining a pointer to an entry in scheme table 196. A data word is formed using the fixed code as shown in block 278. The frequency is set as shown in block 280. The data word is modulated and transmitted as shown in block 282. A check is made to determine if any schemes remain as shown in block 284. If so, blocks 276, 278, 280, and 282 are repeated. If not, the activation routine terminates.

Considering again block 272, if the channel mode corresponding to the asserted input is a rolling code mode, a rolling code appliance activation signal loop is entered. Characteristics of the next rolling code scheme are loaded as shown in block 286. The synchronization counter associated with the current scheme is incremented as shown in block 288. The incremented counter value is also stored. The synchronization counter is encrypted using the crypt key to produce a rolling code value as shown in block 290. A data word is formed using the rolling code value as shown in block 292. The carrier frequency is set as shown in block 294. The data word is modulated and transmitted as shown in block 296. A check is made to determine if any schemes remain in the rolling code mode as shown in block 298. If so, blocks 286, 288, 290, 292, 294, and 296 are repeated. If no schemes remain, the activation routine is terminated.

Figure 11:
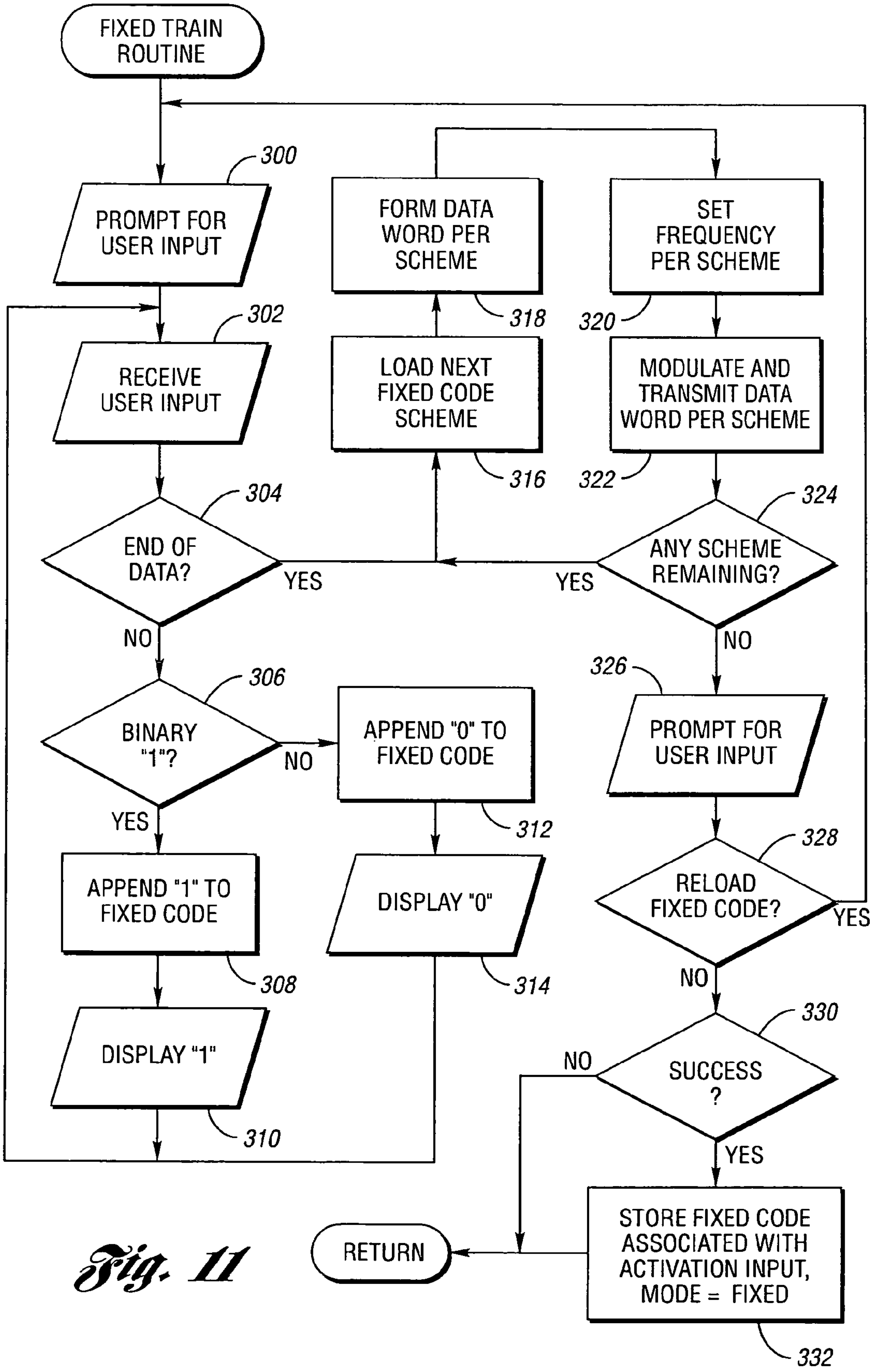

Referring now to FIG. 11, a flow chart illustrating fixed code training is shown. The user is prompted for input as shown in block 300. Prompting may be accomplished, for example, by flashing one or more of user indicator lamps 168. User input 148 is received as shown in block 302. The user enters a fixed code value. This value may be entered, for example, through the use of DIP switches 170. User controls (i.e., activation inputs) 166 provide another means for inputting a fixed code value. In a three button system, a first button 166 can be used to input a binary "1," a second button 166 can be used to input a binary "0", and a third button 166 can be used to indicate completion.

Blocks 304 through 314 describe serially inputting a fixed code value using user controls (i.e., activation inputs) 166. A check is made to determine if an end of data input was received as shown in block 304. If not, a check is made to see if the input value was a binary "1" as shown in block 306. If so, a binary "1" is appended to the fixed code value as shown in block 308, and an indication of binary "1" is displayed as shown in block 310. This display includes illuminating user indicator lamp 168 associated with activation input 166 used to input the binary "1." Returning to block 306, if a binary "1" was not input, a binary "0" is appended to the fixed code as shown in block 312. A display indicating a binary "0" is provided as shown in block 314.

Returning now to block 304, once the fixed code value has been received, a loop is entered to generate a sequence of at least one fixed code appliance activation signal. The next fixed code scheme is loaded as shown in block 316. Preferably, this scheme is based on the number of bits in the received fixed code. A data word is formed based on the loaded fixed scheme as shown in block 318. The data word includes the received fixed code either as received or as a binary modification of the received fixed code. The carrier frequency is set based on the loaded scheme as shown in block 320. The carrier is modulated and the resulting appliance activation signal transmitted as shown in block 322. A check is made to determine if any schemes remain as shown in block 324. If so, the operations indicated in blocks 316, 318, 320, and 322 are repeated. If not, the user is prompted for input and the input received as shown in block 326. One possible indication from the user is a desire to reload the fixed code as shown in block 328. If so, the operation returns to block 300. If not, a check is made to determine if user input indicates success as shown in block 330. If so, the fixed code is stored associated with a specified activation input and the mode is changed to fixed as shown in block 332.

Figure 12:
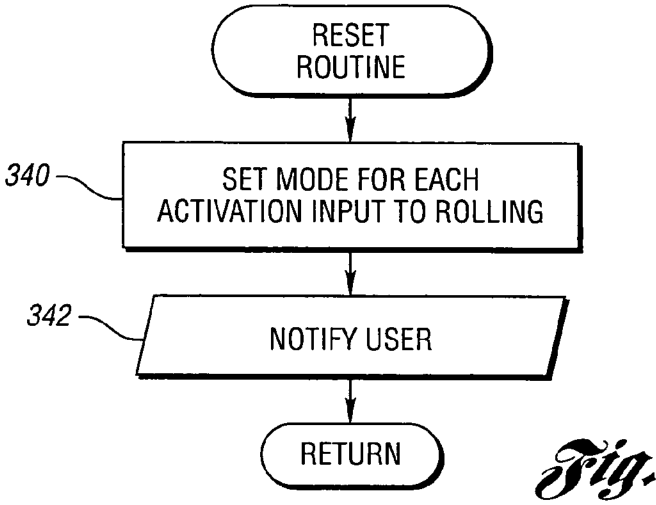

Referring now to FIG. 12, a reset routine is shown. Each activation input channel is set to rolling mode as shown in block 340. The user is notified of successful reset as shown in block 342. Once again, a pattern of flashing indicator lamps 168 may be used for this indication. Alternatively, if a reset routine is entered by asserting a particular user control (i.e., user input) 166 such as, for example, by depressing pushbutton switch 166 for an extended period of time, then only the mode corresponding to that user input need be reset by the reset routine.

Figure 13:
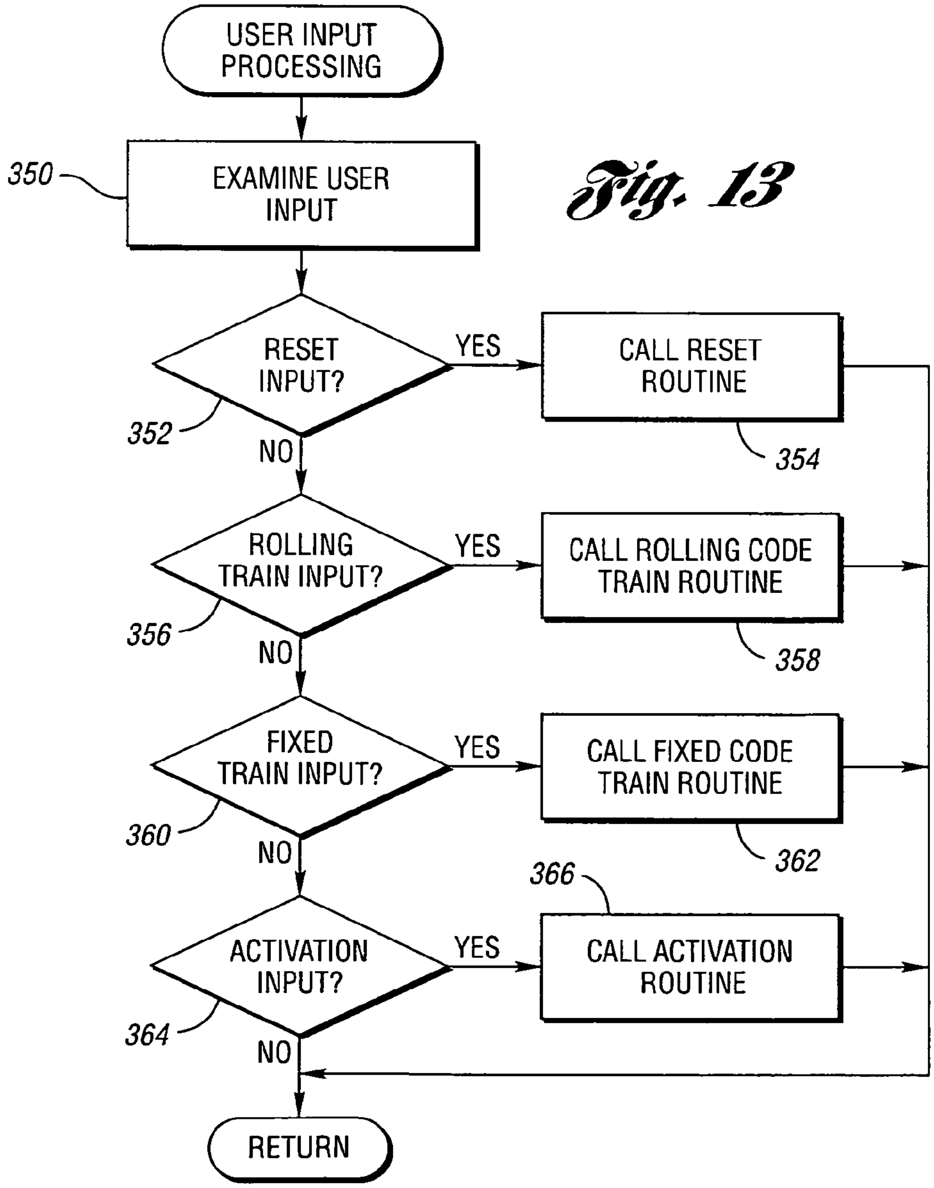
FIGS. 13, 14, 15, and 16 illustrate flow diagrams of alternative programmable remote control operation in accordance with embodiments of the present invention.

Referring now to FIGS. 13-16, flowcharts illustrating alternative operation of programmable remote control 30 are shown. In FIG. 13, user input processing including rolling code training is provided. User input 148 is examined as shown in block 350. A determination is made as to whether or not the user input indicates a reset as shown in block 352. If so, a reset routine is called as shown in block 354. A determination is made as to whether or not the user input specified rolling code training as shown in block 356. If so, a rolling code training routine is called as shown in block 358. If not, a determination is made as to whether fixed code training input was received as shown in block 360. If so, a fixed code training routine is called as shown in block 362. If not, a determination is made as to whether or not one of at least one activation inputs 148 was received as shown in block 364. If so, an activation routine is called as shown in block 366.

Figure 14:
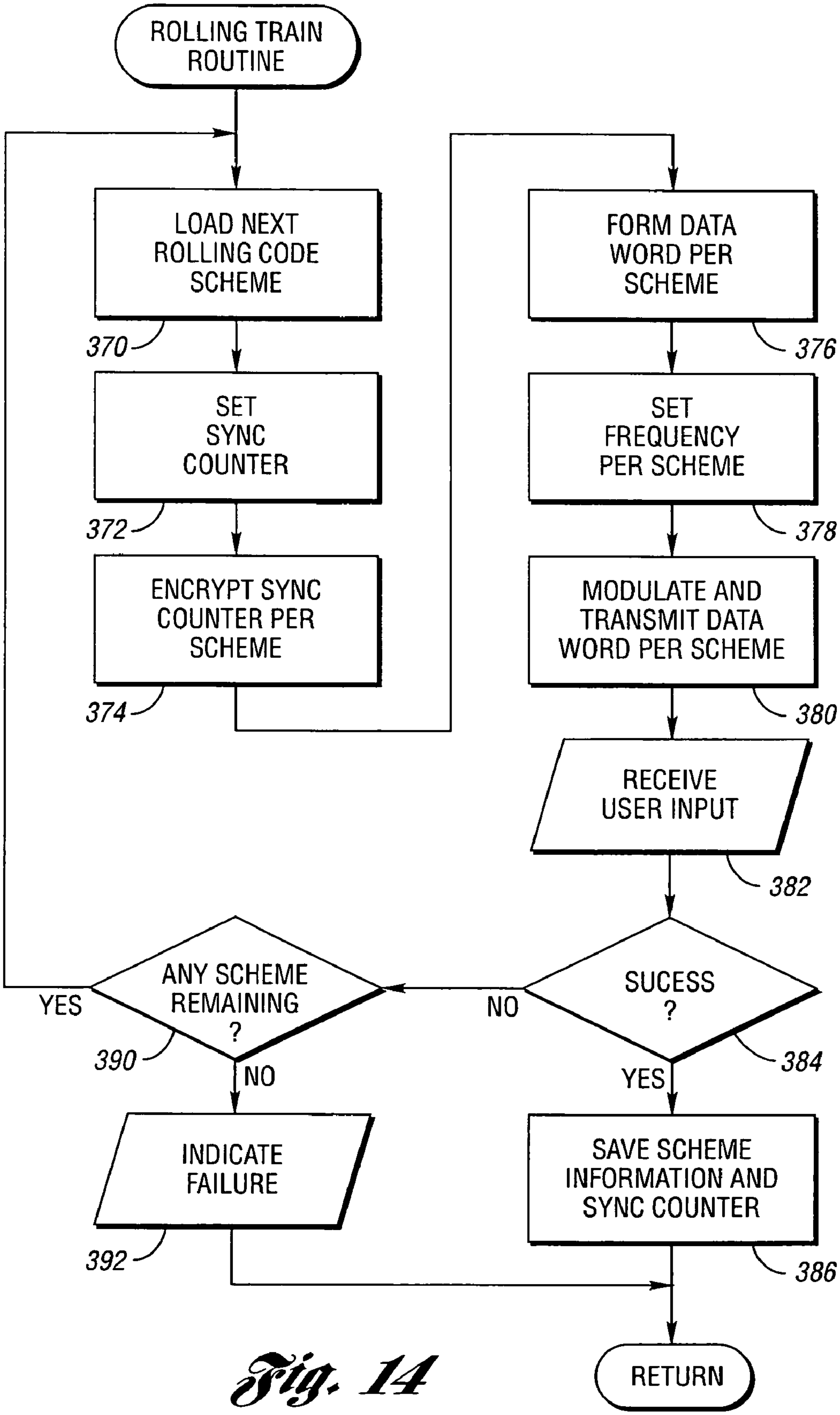

Referring now to FIG. 14, a rolling code training routine is provided. The routine includes a loop in which one or more rolling code appliance activation signals are sent as a test. A user provides feedback 148 regarding whether or not the target appliance was activated.

The next rolling code scheme in the sequence is loaded as shown in block 370. The sync counter, upon which the rolling code is based, is initialized as shown in block 372. The sync counter is encrypted according to the current scheme to generate a rolling code value as shown in block 374. A data word is formed including the generated rolling code value as shown in block 376. The carrier is set as shown in block 378. The data word is used to modulate the carrier according to the current scheme as shown in block 380. The resulting appliance activation signal is transmitted.

The guess-and-test approach requires interaction with the user. In one embodiment, the test pauses until either a positive input or a negative input 148 is received from the user as shown in block 382. In another embodiment, the test pauses for a preset amount of time. If no user input 148 is received within this time, then the system assumes the current test has failed. A check for success is made as shown in block 384. If the user indicates activation, information indicating the one or more successful schemes is saved as shown in block 386. This information may be associated with a particular user activation input. The user may assign a particular user control (i.e. activation input) 166 as part of block 382 or may be prompted to designate a user control (an activation input) as part of block 386.

Returning to block 384, if the user did not indicate successful activation, a check is made to determine if any schemes remain as shown in block 390. If not, a failure indication 150 is provided to the user as shown in block 392. This indication may include a pattern of flashing indicator lamps 168 or the like. If any schemes remain, the test loop is repeated.

The training routine illustrated in FIG. 14 indicates a single activation signal is generated for each test. However, multiple activation signals may be generated and sent with each test. In one embodiment, further tests are conducted to narrow down which scheme or schemes successfully activated the appliance. In another embodiment, control logic 130 stores in memory information indicating the successful sequence so that the successful sequence is retransmitted each time the appropriate activation input is received.

Figure 15:
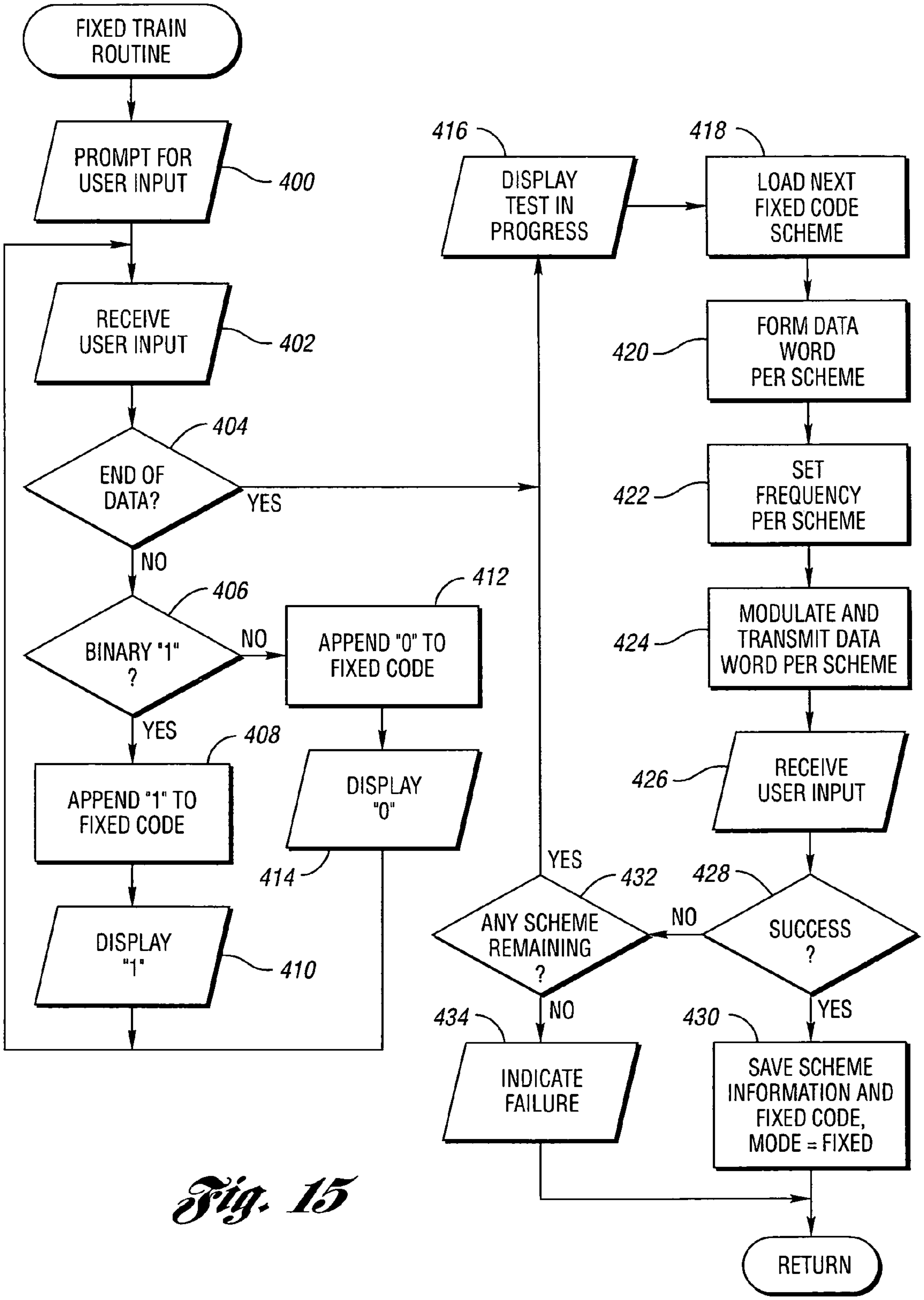

Referring now to FIG. 15, an alternative fixed code training routine is provided. The user is prompted to input a fixed code value as shown in block 400. User input 148 is received as shown in block 402. As previously discussed, the fixed code value may be input through programming switches 172 or user controls (i.e., activation inputs) 166. If the fixed code value is entered by the user, a check is made to determine end of data as shown in block 404. If input did not indicate end of data, a check is made to determine if a binary "1" was input as shown in block 406. If so, a binary "1" is appended to the fixed code as shown in block 408, and a binary "1" is displayed to the user via user indicators 168 as shown in block 410. If not, a binary "0" is appended to the fixed code as shown in block 412, and a binary "0" is displayed to the user via user indicators 168 as shown in block 414.

Returning to block 404, once the fixed code value is received a guess-and-test loop is entered. A display may be provided to the user indicating that the test is in progress as shown in block 416. Information describing the next fixed code scheme is loaded as shown in block 418. A data word is formed containing the fixed code as shown in block 420. The carrier frequency is set as shown in block 422. The data word is used to modulate the carrier, producing an activation signal, which is then transmitted as shown in block 424. User input regarding the success of the test is received as shown in block 426. Once again, the system may pause for a preset amount of time and, if no input is received, assume that the test was not successful. Alternatively, the system may wait for user input specifically indicating success or failure. A check is made to determine whether or not the test was successful as shown in block 428. If so, information specifying the one or more successful schemes and the fixed code value are saved by control logic 130. This information may be associated with a particular user control 166 (i.e., a particular activation input) specified by the user. In addition, the mode is changed to fixed mode for the selected activation input. If success was not indicated, a check is made to determine if any schemes remain as shown in block 432. If not, failure is indicated to the user as shown in block 434. If any schemes remain, the test loop is repeated.

The guess-and-test scheme illustrated in FIG. 15 generates and transmits a single activation signal with each pass through the loop. However, as with rolling code training, more than one fixed code activation signal may be sent within each test. Once success is indicated, the user may be prompted to further narrow the selection of successful activation signals. Alternatively, information describing the sequence can be stored and the entire sequence retransmitted upon receiving an activation signal to which the sequence is associated.

Figure 16:
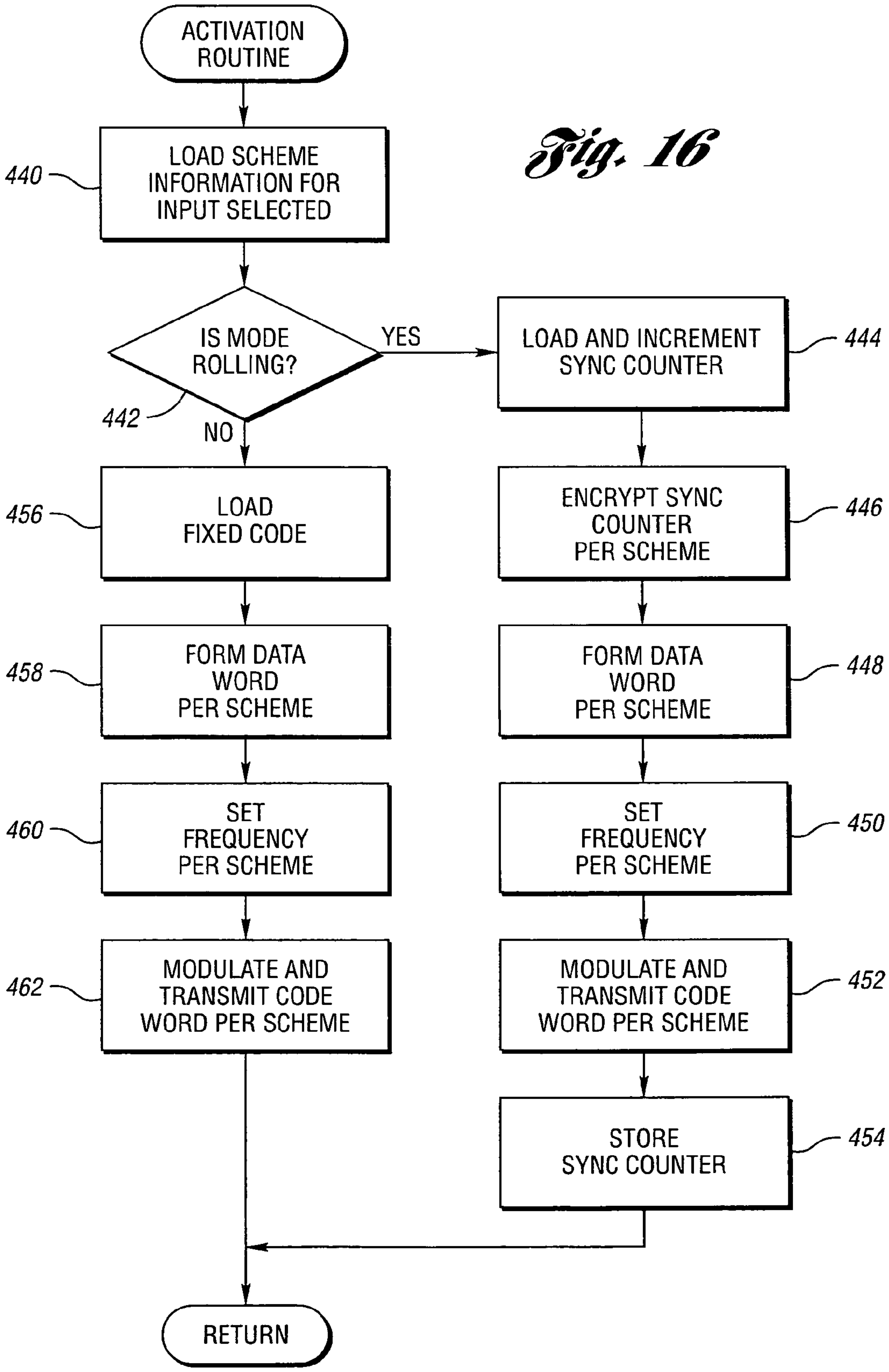

Referring now to FIG. 16, a flow chart illustrating an activation routine according to an embodiment of the present invention is shown. Information associated with an asserted activation input 166 is retrieved as shown in block 440. A check is made to determine if the mode associated with the activation channel is rolling as shown in block 442. If so, the sync counter is loaded and incremented as shown in block 444. The sync counter is encrypted to produce a rolling code value as shown in block 446. A data word is formed including the rolling code value as shown in block 448. The carrier frequency is set as shown in block 450. The data word is used to modulate the carrier frequency, producing an appliance activation signal which is then transmitted, as shown in block 452. The sync counter is stored by control logic 130 as shown in block 454.

Returning to block 442, if the mode is not rolling, then the stored fixed code value is retrieved as shown in block 456. A data word is formed including the retrieved fixed code as shown in block 458. The carrier frequency is set as shown in block 460. The data word is used to modulate the carrier, producing an appliance activation signal which is then transmitted, as shown in block 462.

Various embodiments for programming to fixed and rolling code appliances and for responding to user control activation input for fixed and rolling code appliances have been provided. These methods may be combined in any manner. For example, remote control 30 may implement a system which transmits every rolling code appliance activation signal upon activation of a rolling code channel and uses guess-and-test training for programming a fixed code channel. As another example, remote control 30 may be configured for guess-and-test training using every possible rolling code scheme but, when training for fixed code, generates and transmits appliance activation signals based on only those fixed code schemes known to be used with a fixed code value having a number of bits equal to the number of bits of the fixed code value entered by the user.

As described herein, a programmable remote control 30 includes user control module 41 and transmitter module 42 which are remotely located from one another in a vehicle and are directly interconnected to one another by a wired connection 44. An advantage of the separate location of modules 41, 42 is that transmitter 132 of transmitter module 42 need not be placed near user controls 166 of user control module 41. Instead, user control module 41 may be placed near the vehicle passenger seat whereas transmitter module 42 may be placed at a location in the vehicle optimizing RF transmission from vehicle 32. This facilitates the design of the vehicle interior. For example, user controls 166 and user indicators 168 may be located for easy user access such as in an overhead console, a visor, a headliner, and the like without requiring extra space for transmitter module 42.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A vehicle-based programmable appliance control system for controlling an appliance responsive to an activation signal based on an appropriate fixed code transmission scheme and having a fixed code associated with the appliance, the system comprising:

a wired connection having first and second ends;

a user control module having a user control and a programming input, the user control module is connected to the first end of the wired connection; and a transmitter module remotely located from the user control module and connected to the second end of the wired connection, the transmitter module having memory holding data describing a plurality of possible fixed code transmission schemes, the transmitter module further having a radio frequency transmitter operative to wirelessly transmit different activation signals based on any of the possible transmission schemes, the transmitter implementing a programming mode and an operating mode;

wherein the memory holds the data describing the possible transmission schemes without any of the data being received by either the user control module or the transmitter module from either another system used to control the appliance or from the appliance;

wherein one of the possible transmission schemes is the appropriate transmission scheme such that the appliance activates upon receiving from the transmitter an activation signal based on the one of the possible transmission schemes and having the fixed code associated with the appliance;

wherein the transmitter module receives a fixed code represented by a sequence of bits from the user control module over the wired connection in response to assertion of the programming input;

wherein the transmitter in the programming mode wirelessly transmitting a sequence of different activation signals including different sets of first and second activation signals in which each set of activation signals is based on a respective one of the possible transmission schemes and each first activation signal includes the sequence of bits representing the received fixed code and each second activation signal includes a bitwise reversal of the sequence of bits representing the received fixed code until user input indicating activation of the appliance is received by the transmitter module from the user control module over the wired connection, wherein the bitwise reversed sequence is such that the first bit in the sequence of bits representing the received fixed code is the last bit in the bitwise reversed sequence and the last bit in the sequence of bits representing the received fixed code is the first bit in the bitwise reversed sequence, wherein the transmitter module determines the transmission scheme for the last transmitted activation signal to be the appropriate transmission scheme upon receiving the user input indicating activation of the appliance and stores in the memory data associating the transmission scheme for the last transmitted activation signal with the user control;

wherein the transmitter in the operating mode wirelessly transmitting an activation signal based on the transmission scheme associated with the user control upon the transmitter module receiving from the user control module over the wired connection a user activation signal in response to assertion of the user control.

2. The system of claim 1 wherein:

the user control includes at least one button, each button generates a user activation signal upon assertion.

3. The system of claim 2 wherein:

the transmitter is programmed to associate each of the buttons with a respective one of the plurality of appliance activation signals;

wherein the transmitter transmits the appliance activation signal associated with a button in response to the user control module transmitting the corresponding user activation signal over the wired connection to the transmitter module.

4. The system of claim 1 wherein:

the user control includes at least one switch, each switch generates a user activation signal upon assertion.

5. The system of claim 1 wherein:

the wired connection is part of a vehicle wiring harness.

6. The system of claim 5 wherein:

the user control module receives electrical power from another part of the vehicle wiring harness for its operation;

wherein the user control module supplies some of the received power over the wired connection to the transmitter module for its operation.

7. The system of claim 1 wherein:

the transmitter module receives electrical power from a vehicle wiring harness for its operation;

wherein the transmitter module supplies some of the received power over the wired connection to the user control module for its operation.

8. A method of programming a vehicle-based remote control for controlling an appliance responsive to an activation signal based on an appropriate fixed code transmission scheme and having a fixed code associated with the appliance, the method comprising:

providing a user control module connected to a first end of a wired connection and a transmitter module connected to a second end of the wired connection such that the user control module and the transmitter module are remotely located from one another, the user control module having a user control and a programming input;

storing in the transmitter module data describing a plurality of possible fixed code transmission schemes without any of the data being received by either the user control module or the transmitter module from either another remote control used to control the appliance or from the appliance;

wherein one of the possible transmission schemes is the appropriate transmission scheme such that the appliance activates upon receiving from the transmitter module an activation signal based on the one of the possible transmission schemes and having the fixed code associated with the appliance;

receiving a fixed code represented by a sequence of bits at the user control module in response to assertion of the user programming input;

transferring the received fixed code from the user control module over the wired connection to the transmitter module;

wirelessly transmitting from the transmitter module a sequence of different activation signals including different sets of first and second activation signals in which each set of activation signals is based on a respective one of the possible transmission schemes and each first activation signal includes sequence of bits representing the received fixed code and each second activation signal includes a bitwise reversal of the sequence of bits representing the received fixed code until user input indicating activation of the appliance is received by the transmitter module from the user control module over the wired connection, wherein the bitwise reversed sequence is such that the first bit in the sequence of bits representing the received fixed code is the last bit in the bitwise reversed sequence and the last bit in the sequence of bits representing the received fixed code is the first bit in the bitwise reversed sequence;

determining the transmission scheme for the last transmitted activation signal to be the appropriate transmission scheme upon the transmitter module receiving the user input indicating activation of the appliance;

storing in the transmitter module data associating the transmission scheme for the last transmitted activation signal with the user control of the user control module; and wirelessly transmitting from the transmitter module an activation signal based on the transmission scheme associated with the user control upon the transmitter module receiving from the user control module over the wired connection a user activation signal in response to assertion of the user control.

9. The system of claim 8 wherein:

the wired connection is part of a vehicle wiring harness.

* * * * *